United States Patent [19]

Grubbs et al.

[11] Patent Number: 5,191,025
[45] Date of Patent: Mar. 2, 1993

[54] POLYMERIZATION OF CIS-5,6-BIS(TRIMETHYLSILOXY)-1,3-CYCLOHEXADIENE AND OTHER SUBSTITUTED CYCLOHEXADIENES

[75] Inventors: Robert H. Grubbs, South Pasadena; Douglas L. Gin; Vincent P. Conticello, both of Pasadena, all of Calif.

[73] Assignee: California Institute of Technology, Pasadena, Calif.

[21] Appl. No.: 831,788

[22] Filed: Feb. 5, 1992

Related U.S. Application Data

[60] Division of Ser. No. 697,220, May 7, 1991, Pat. No. 5,122,574, which is a continuation-in-part of Ser. No. 647,576, Jan. 29, 1991, Pat. No. 5,128,418.

[51] Int. Cl.⁵ .......................................... C08F 130/08
[52] U.S. Cl. ................................ 525/326.5; 525/355; 525/359.1; 525/359.2; 525/367; 525/378
[58] Field of Search ................ 525/326.5, 355, 359.1, 525/359.2, 367, 378

*Primary Examiner*—Joseph L. Schofer
*Assistant Examiner*—M. Nagumo
*Attorney, Agent, or Firm*—Benman & Collins

[57] ABSTRACT

The monomer cis-5,6-bis(trimethylsiloxy)-1,3-cyclohexadiene can be polymerized with certain nickel II catalysts, such as bis[(allyl)trifluoroacetatonickel(II)], bis[(allyl)pentafluorophenoxynickel(II)], and bis[(allyl)iodonickel(II)]. The resulting polymer is a precursor to poly(para-phenylene). Other substituted cyclohexadienes may also be polymerized by these catalysts to form useful polymers.

7 Claims, 23 Drawing Sheets

POLYMERIZATION OF CIS-5,6-BIS(TRIMETHYLSILOXY)-1,3-CYCLOHEXADIENE AND OTHER SUBSTITUTED CYCLOHEXADIENES

ORIGIN OF INVENTION

The U.S. Government has rights in this invention pursuant to Contract No. AFOSR-88-0094, awarded by the Department of the Air Force.

CROSS-REFERENCE TO RELATED APPLICATION

This is a division of application Ser. No. 07/697,220, filed May 7, 1991, now U.S. Pat. No. 5,122,574 which is a continuation-in-part application of Ser. No. 07/647,576, filed Jan. 29, 1991, now U.S. Pat. No. 5,128,418.

TECHNICAL FIELD

The present invention relates to the polymerization of poly(para-phenylene), and, more particularly, to the preparation of a precursor thereto.

BACKGROUND ART

Poly(para-phenylene) (PPP) is a fully aromatic, rigid rod polymer with unique structural and conductive properties. As an engineering plastic, its attractiveness arises from its thermal stability (mp>500° C.), high strength, chemical inertness, and solvent resistance. When doped with either n- or p-type dopants, the polymer forms highly conducting charge transfer complexes with conductivities up to 500 S/cm. However, the structural properties which make PPP so attractive also make it a difficult polymer to synthesize. In addition, many of the observed properties of the polymer depend on the method of production.

Previous methods of producing PPP directly have met with only limited success. For example, oxidative cationic polymerization of benzene to produce PPP has been attempted. However, only short oligomers of ten to fifteen repeat units containing mixtures of linear 1,4- and non-linear 1,2-units were formed.

Polymerizations using nickel catalyzed aryl coupling of 1,4-dihalobenzenes were attempted. While this method produced a completely linear molecule, only short oligomers consisting of ten to twelve units were formed.

The problem with these direct synthetic methods is that the inherent insolubility of the polymer causes it to precipitate out of solution before high molecular weight materials can be formed. Electrochemical coupling of benzene has also been used, but the resulting film is insoluble and composed of a mixture of 1,4- and 1,2-linked units.

In order to circumvent the problem of the inherent insolubility of PPP in production and processing, soluble precursor methodologies have been developed. For example, polymers of 1,3-cyclohexadiene (CHD) have been used as a soluble precursor polymer. In particular, poly(cyclohexadiene) has been reacted with bromine and then pyrolyzed to eliminate HBr. Unfortunately, this polymerization route also produces a precursor polymer with a mixture of 1,4- and 1,2-linkages. In addition, the elimination reaction is not very efficient, since HBr readily reacts with unsaturated intermediates.

Recently, the efficient production of PPP has been reported, via the pyrolysis of a soluble precursor polymer prepared from the radical polymerization of the acetyl and methoxycarbonyl derivatives of 5,6-dihydroxy-1,3-cyclohexadiene (DHCD); see, e.g., D. G. Ballard et al, *Macromolecules*, Vol. 21, pp. 294-304 (1988) and D. R. McKean, *Macromolecules*, Vol. 20, pp. 1787-1792 (1987). The starting cis-diol is produced by the microbial oxidation of benzene. The precursor films are soluble and can be processed before pyrolysis to the final polymer. However, the radical polymerization produces about 85% 1,4-linked units and 15% 1,2-linked units. The 1,2-units create "kinks" in the polymer, there-by reducing the elimination efficiency of the precursor and the mechanical properties of the final polymer.

In order for the good mechanical properties of PPP to be realized, an aspect ratio of at least 100 consecutive linear 1,4-units per 1,2-unit must be obtained. All previous routes to PPP have either produced low molecular weight materials due to insolubility of the growing polymer, or have incorporated a significant amount of 1,2-linkages in the chains, or both. Hence, it is desirable to find an exclusively 1,4-polymerization method which can be used in combination with the efficient precursor method described above.

DISCLOSURE OF INVENTION

In accordance with the invention, cis-5,6-bis(trimethylsiloxy)-1,3-cyclohexadiene is polymerized in the presence of a nickel(II) catalyst having an allyl group and a non-basic electron withdrawing ancillary ligand; examples include bis[(allyl)trifluoroacetatonickel(II)], bis[(allyl)pentafluorophenoxynickel(II)], and bis[(allyl)iodonickel(II)]. This novel polymer is suitably employed as a precursor to PPP.

More specifically, the polymer that is formed, 1,4-poly(cis-5,6-bis(trimethylsiloxy)-1,3-cyclohexadiene) or 1,4-poly(TMS-CHD), is converted to the corresponding diacetoxy polymer, 1,4-poly(cis-5,6-diacetoxy-1,3-cyclohexadiene) or 1,4-poly(DA-CHD), by reacting with acetyl chloride in the presence of zinc chloride or ferric chloride. To ensure 100% acetylation, the 1,4-poly(DA-CHD) is retreated with an excess of pyridine and either acetic anhydride or acetyl chloride.

The polymer 1,4-poly(TMS-CHD) is also converted to fully acetylated 1,4-poly(DA-CHD) by deprotection of the trimethylsiloxy groups to hydroxy groups, such as by using a fluoride source. The resulting hydroxy polymer, 1,4-poly(cis-5,6-dihydroxy-1,3-cyclohexadiene) or 1,4-poly(DH-CHD), is then treated with pyridine and either acetic anhydride or acetyl chloride to yield the fully acetylated 1,4-poly(DA-CHD).

The fully acetylated 1,4-poly(DA-CHD) is then converted to poly(para-phenylene) by the pyrolysis reaction with loss of acetic acid.

BEST MODES FOR CARRYING OUT THE INVENTION

Figure 1A:
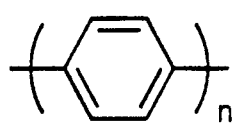
FIGS. 1a and 1b depict the 1,4- and 1,2-linkages of poly(para-phenylene), respectively.
Figure 1B:
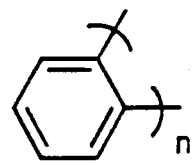

The 1,4- and 1,2-linkages of poly(para-phenylene) (PPP) are depicted in FIGS. 1a and 1b, respectively. It is desired to produce PPP having essentially 100% 1,4-linkages, which is defined herein as at least about 96%. The process of the invention results in PPP having such linkages. The essentially 100% 1,4-linkages achieved in accordance with the invention is considerably higher than that achieved in the prior art; PPP prepared by prior art processes typically includes 10 to 15% 1,2-linkages.

Figure 2:
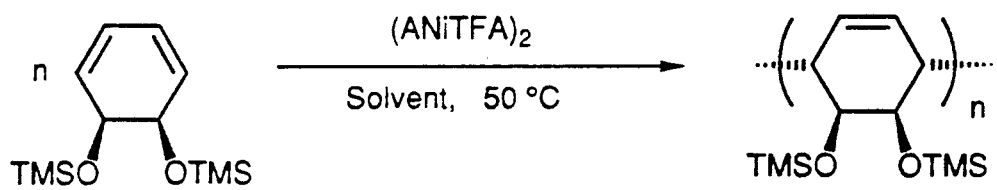
FIG. 2 depicts the polymerization of cis-5,6-bis(trimethylsiloxy)-1,3-cyclohexadiene (TMS-CHD)
Figure 3A:
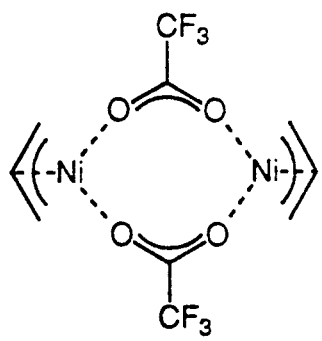
FIG. 3a depicts the structure of bis[(allyl)trifluoroacetatonickel(II)] (ANiTFA)$_2$.
Figure 3B:
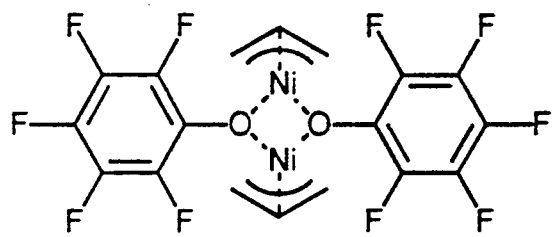
FIG. 3b depicts the structure of bis[(allyl)pentafluorophenoxynickel(II)]
Figure 3C:
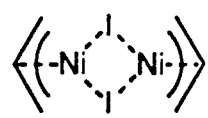
FIG. 3c depicts the structure of bis[(allyl)iodonickel(II)]

The reaction sequence for polymerizing cis-5,6-bis(-trimethylsiloxy)-1,3-cyclohexadiene (TMS-CHD) is shown in FIG. 2. The polymerization is achieved, preferably using a nickel catalyst having an oxidation state of two, an allyl group, and a non-basic, electron-withdrawing ligand. Examples of such catalysts include: bis[(allyl)trifluoroacetatonickel(II)] (ANiTFA)$_2$), bis[-(allyl)pentafluorophenoxynickel(II)], and bis[(allyl)iodonickel(II)]. The structures for these three catalysts are given in FIGS. 3a, 3b, and 3c, respectively.

Bis[(allyl)trifluoroacetatonickel(II)] (ANiTFA)$_2$ is known to polymerize 1,3-butadiene to exclusively 1,4-polybutadiene (PBD). The cis/trans ratio of the poly(-butadiene) produced, as well as other properties such as molecular weight, depend on the solvent system used during polymerization and the presence of electron donating or accepting additives.

Although (ANiTFA)$_2$ has been thoroughly studied with butadiene, it has not been used with cyclic 1,3-dienes or in the presence of heteroatom functionalities. This catalyst has never, at least to Applicants, knowledge, homopolymerized a heteroatom-substituted diene, or a cyclic diene. It has only been used to copolymerize a heteroatom-substituted diene with butadiene. Also, transition metal catalysts used for diene polymerization are generally not compatible with heteroatom functionalities, and there has not been a demand for poly-cyclic dienes or functionalized PBD. Only the elastomers and thermoplastics of PBD have been in demand. The usefulness of functionalized dienes (especially for PPP synthesis) has only been recently discovered.

For polymerizing cyclic monomers, the cis/trans geometry is of no concern, since the ring will always adopt a cisoid diene configuration. Only the 1,4- vs. 1,2-regiochemistry is important, and whether the catalyst is compatible with polar functionalities.

To determine the possible use of (ANiTFA)$_2$ in polymerizing the trimethylsiloxy-substituted cyclohexadiene, the polymerization of 1,3 cyclohexadiene (CHD) using this catalyst was studied. A small amount of white, insoluble poly(cyclohexadiene) (PCHD) powder was produced, which indicated that (ANiTFA)$_2$ can polymerize a cyclic diene system. However, owing to the polymer's insolubility, the 1,4- vs. 1,2- content could not be determined.

Working under the assumptions that the efficiency of the reaction was limited by either the insolubility of the growing chains or the catalyst activity's solvent dependence, the effect of various solvents on the system was studied. The results are listed in Table I, below.

TABLE I

Solvent Trends on CHD Polymerization.

| Solvent | % Yields | Polymer Properties |
|---|---|---|
| (neat) | 27.1 | insoluble |
| n-heptane | 4.7 | insoluble |
| benzene | 11.2 | sol., >90% 1,4 |
| chlorobenzene | 31.3 | insoluble |
| o-dichlorobenzene | 66.7 | insol., crystalline |
| o-dichlorobenzene/BHT | 55.5 | insol., crystalline |

Further purification of the monomer prior to reaction made isolated yields up to 88.4% possible. Clearly, the more polar solvents produce higher polymer yields. This appears to be a solvent effect on the catalyst, since in all cases, the polymer produced was insoluble in these solvents. Only in the case of benzene was a small fraction of the resulting polymer soluble enough for NMR analysis.

By comparing the ratio of the integrals of the $^1$H NMR signals at 1.6 and 2.0 ppm, the soluble fraction of the PCHD sample was determined to be approximately 95% 1,4-linked. Gel permeation chromatography (GPC) of the soluble fraction revealed that the chains are only comprised of ten to eleven monomer units with a polydispersity index (PDI) of 1.78.

The 1,4-regiochemistry of the polymers produced was also supported by the fact that the insoluble polymers were crystalline. Wide angle, powder X-ray diffraction on the polymers showed sharp diffraction lines corresponding to lattice spacings similar to those observed for crystalline terphenyl and PPP.

Differential scanning calorimetry (DSC) revealed that the crystalline PCHD was thermally stable up to 320° C. This value is over 100° C. higher than the PCHD samples produced by one prior art technique, involving Ziegler catalysts (TiCl$_4$) and cationic polymerization of benzene (D. A. Frey et al, *Journal of Polymer Science*, Part A, Vol. 1, p. 2057-2065 (1963)), and slightly higher than those made with a similar catalyst, bis[(allyl)iodonickel(II)], whose composition was reported to be >90% 1,4-linked. Endotherms at 367° C. and approximately 510° C. were also observed for this polymer. It is not clear what these endotherms are due to; decomposition and glass transitions are possibilities.

(ANiTFA)$_2$ can also be used in o-dichlorobenzene to polymerize 5-alkyl-1,3-cyclohexadienes, as can the catalyst bis[(allyl)pentafluorophenoxynickel(II)]. These alkyl-substituted PCHD polymers have interesting properties and may be useful in the future as comonomers. These polymers appear to be soluble materials which can be used in high temperature environments (due to their high thermal stability), as exemplified by 5-methyl-1,3-cyclohexadiene. Other alkyl groups include neopentyl. The process for forming these alkyl cyclohexadienes works with any 1,3-cyclohexadiene with pure hydrocarbon chains on the 5 and/or 6 positions on the ring.

Reaction of the acetyl derivative of cis-5,6-dihydroxy-1,3-cyclohexadiene (DHCD) with (ANiTFA)$_2$ did not produce any polymers, nor did the reaction of the methoxycarbonyl derivative. Analysis of the resulting reaction mixture in each case revealed that most of the monomer remained intact, but the catalyst decomposed to a green solid reminiscent of an inorganic nickel salt.

However, a 1:1 ratio of 1,3-cyclohexadiene (CHD) and bis(methoxycarbonyl)-1,3-cyclohexadiene (BMC-CHD) in benzene did produce a copolymer in low yields. The product was a soluble white powder whose $^1$H NMR spectrum clearly showed a signal at 3.75 ppm due to incorporated methoxycarbonyl functionalities. The effect of various solvents on this polymerization system was studied as in the case of PCHD; the results are tabulated in Table II, below.

TABLE II

Solvent Trends on a 1:1 Feed Ratio of CHD and BMC-CHD.

| Solvent | % Yield |
|---|---|
| (neat) | 1.5 |
| benzene | 1.5 |
| toluene | 0.4 |
| chlorobenzene | 2.3 |
| o-dichlorobenzene | 4.5 |

In all cases, a 1:1 ratio of the two monomers produced polymers which were completely soluble. GPC analysis indicated that the products should be considered short oligomers rather than polymers.

Once the best solvent for the system was determined to be ortho-dichlorobenzene (o-DCB), a study to determine how different monomer feed ratios would affect the polymer yields and properties was undertaken. The results are summarized in Table III.

TABLE III

Feed Ratio Trends on Copolymerization in o-DCB.

| CHD | BMC-CHD | % Yield |
|---|---|---|
| 0 | 100 | 0 |
| 1 | 10 | 1.6 |
| 1 | 4 | 2.4 |
| 1 | 2 | 2.6 |
| 1 | 1 | 4.5 |
| 2 | 1 | 3.5 |
| 4 | 1 | 5.8 |
| 10 | 1 | 13.2 |
| 100 | 0 | 66.7 |

While greater BMC-CHD to CHD ratios greatly reduce the polymer yields due to catalyst deactivation, they also increase the solubility of the polymer due to greater methoxycarbonyl monomer incorporation in the polymer.

The conclusion that can be drawn from the foregoing is that use of the acetyl and methoxycarbonyl derivatives of DHCD with (ANiTFA)$_2$ does not provide a better route to a PPP precursor. Functional group incompatibility with the catalyst is the most likely reason. This assumption was confirmed by adding various amounts of a carbonyl-containing compound (ethyl acetate; EtOAc) to a typical CHD polymerization reaction. The results are shown in Table IV, below.

TABLE IV

Effect of Ethyl Acetate on CHD Polymerization.

| Catalyst | EtOAc | CHD | % Yield |
|---|---|---|---|
| 1 | 0 | 470 | 66.7 |
| 1 | 4 | 470 | 19.7 |
| 1 | 470 | 470 | 2.5 |

The most plausible explanations for these functional group incompatibilities are (1) that the polar carbonyl group can coordinate to the catalyst open site, thereby causing deactivation, or (2) that ester exchange reactions occur to give an inert nickel species when other ester-like groups are present. Another possibility for the monomers' incompatibility may be that the catalyst facilitates aromatization, as in the case of CHD, and the acidic side products of this reaction (ROH) destroy the catalyst.

Cis-5,6-bis(trimethylsiloxy)-1,3-cyclohexadiene (TMS-CHD) was prepared from cis-DHCD and reacted with (ANiTFA)$_2$. The polymerization of TMS-CHD with (ANiTFA)$_2$ in chlorobenzene has been optimized, and the percent yields show dependencies on the concentration of TMS-CHD and monomer to-catalyst ratio, FIGS. 4 and 5, respectively. There, it is seen that the polymer yield is at least about 80% for a monomer concentration of at least about 0.9 Molar (monomer-to-catalyst ratio=80:1) and that the polymer yield is at least about 80% for a monomer-to-catalyst ratio in the range of about 50:1 to 150:1. Higher ratios may be used, providing the increased viscosity that accompanies such higher ratios is taken into account, such as by monomer dilution.

Figure 4:
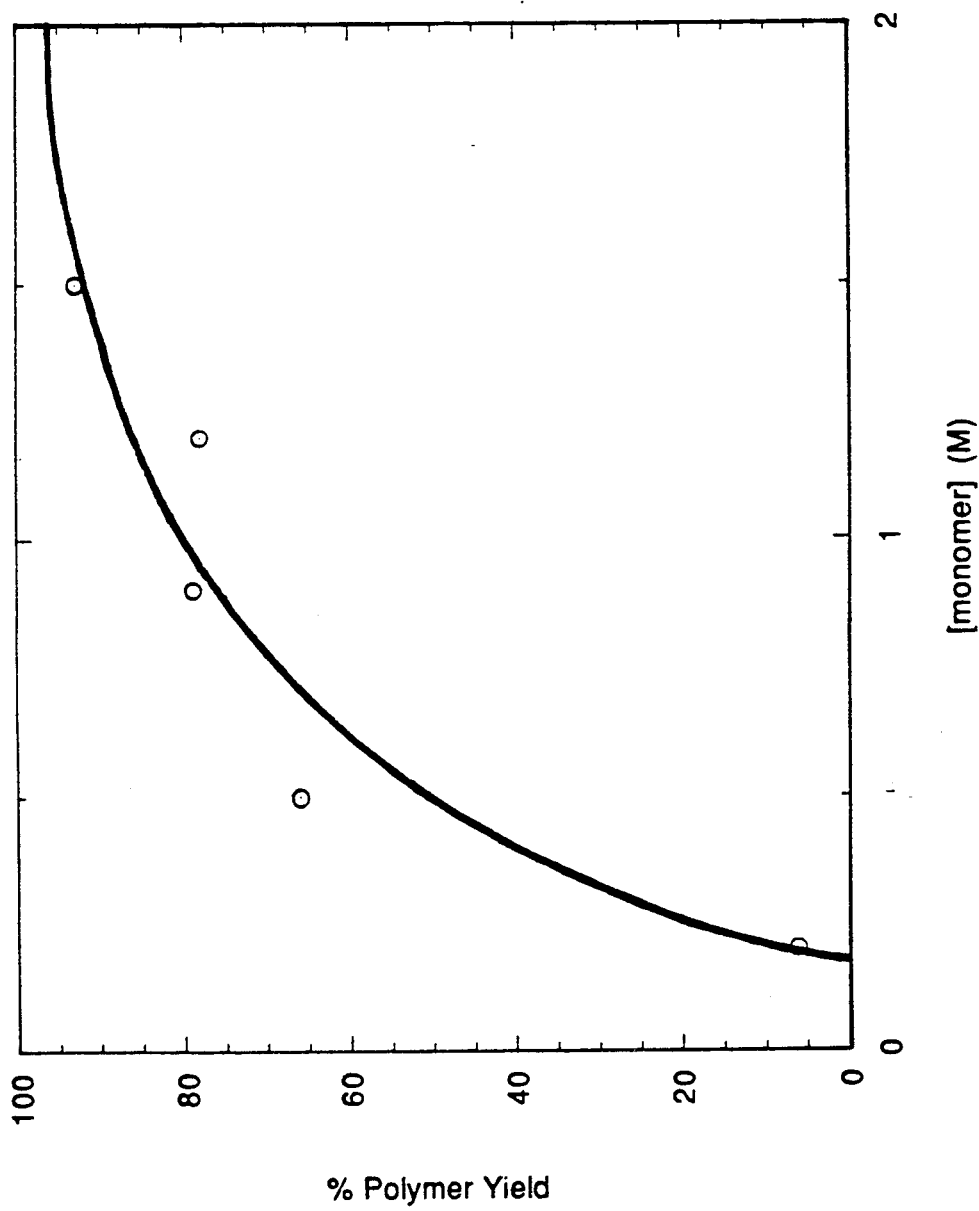
FIG. 4, on coordinates of percent polymer yield and monomer concentration (molar), is a plot of the dependence of polymer yield as a function of monomer concentration for the TMS-CHD system, with the monomer-to-catalyst ratio=80:1, where the catalyst is bis[(allyl)trifluoroacetatonickel(II)]
Figure 5:
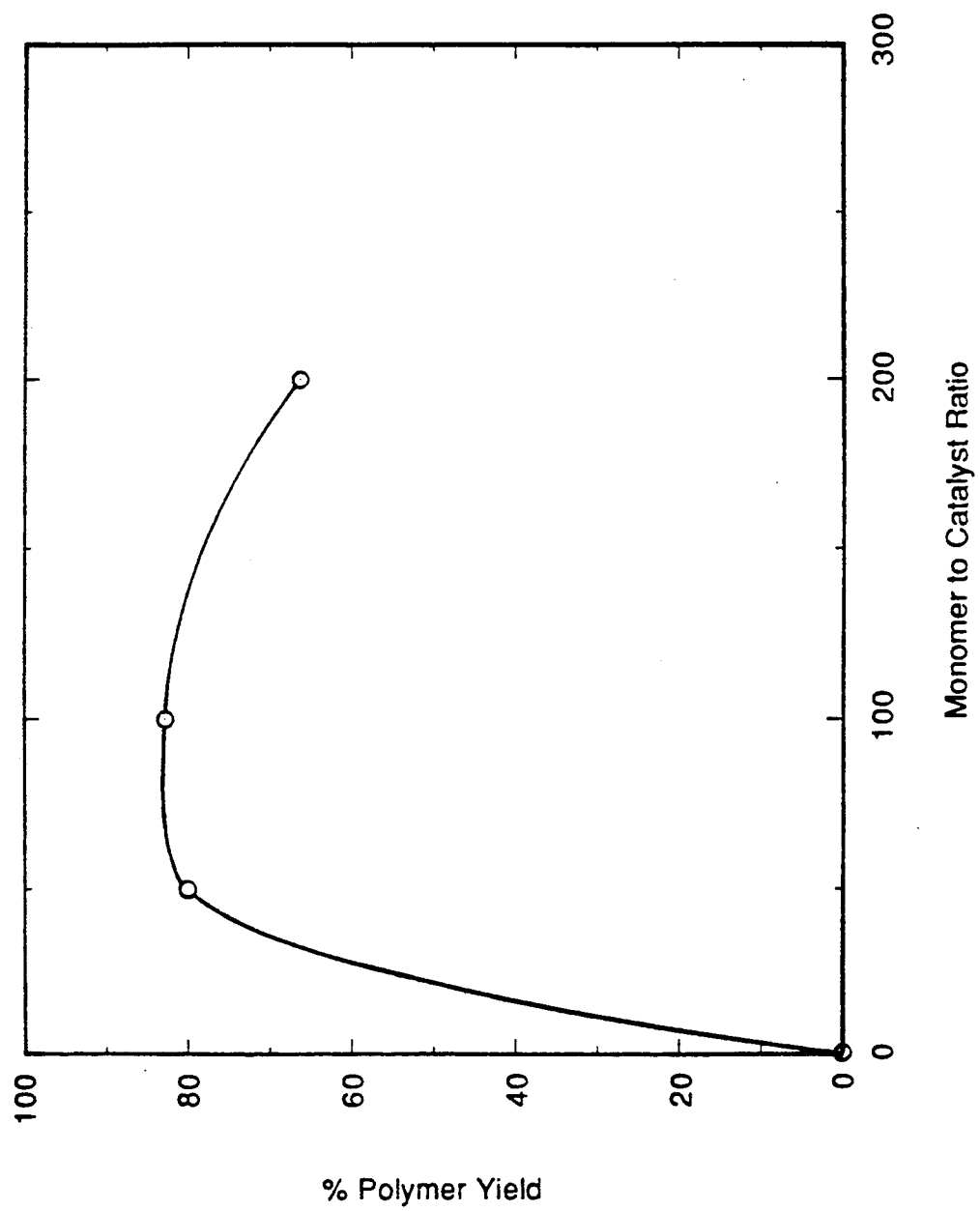
FIG. 5, on coordinates of percent polymer yield and ratio of monomer to catalyst, is a plot of the dependence of polymer yield as a function of the monomer-to-catalyst ratio for the system of FIG. 4.

The lower limit of the TMS-CHD concentration is about 0.14 Molar; below this value, no polymer is formed. The optimum TMS-CHD concentration is about 1.5 Molar, which gives 93% isolated yield of polymer with a monomer:catalyst ratio of 80:1 (FIG. 4).

TMS-CHD has an oxygen-containing group which is relatively non-coordinating compared to carbonyl groups. Also, the monomer is less susceptible to aromatization, since TMS-OH is a relatively poor leaving group upon elimination in comparison to the acetate or carbonate groups.

Polymerization of this monomer with (ANiTFA)$_2$ was possible in a variety of aromatic solvents to give a soluble white powder which was suitable for GPC analysis. The results are listed in Table V, below.

TABLE V

Polymerization of TMS-CHD in Various Aromatic Solvents.

| Solvent | Polymer Yield | Mn | Mw | PDI |
| --- | --- | --- | --- | --- |
| benzene | 13% | 5667 | 6910 | 1.22 |
| chlorobenzene | 56 | 21466 | 37882 | 1.76 |
| o-dichlorobenzene | 24 | 24245 | 41495 | 1.71 |

The effect of solvent polarity on this system was different than with previous monomers. Although the catalyst is generally more active in more polar aromatic solvents, the polymer itself is more soluble in non-polar solvents. With chlorobenzene, which is between o-dichlorobenzene and benzene in terms of polymer chain solubility and catalytic enhancement, optimum yields were obtained. The polymerization was also performed in a 1:1 v/v solution of o-DCB and benzene. The isolated polymer yields were similar to those obtained with chlorobenzene. As can be seen in Table V, the molecular weights (Mw) are similar and correspond to average degrees of polymerization of 85 to 90. Isolated yields up to 93% are possible if the monomer concentration is increased, and the monomer is further purified by filtration through alumina.

Figure 6:
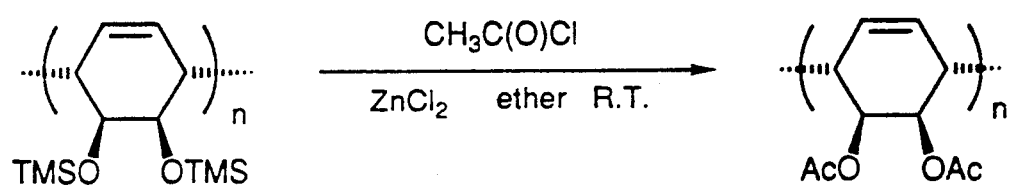
FIG. 6 depicts the conversion of 1,4-poly(cis-5,6-bis(-trimethylsiloxy)-1,3-cyclohexadiene) to 1,4-poly(cis-5,6-diacetoxy-1,3-cyclohexadiene)
Figure 7:
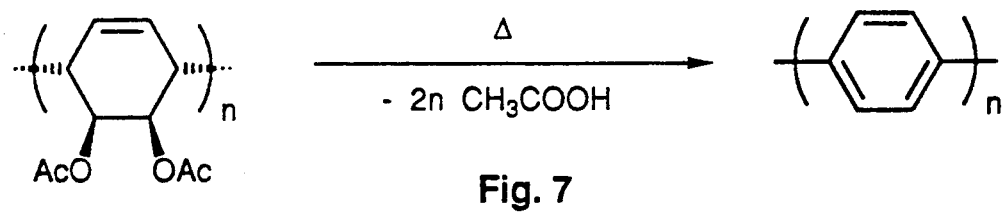
FIG. 7 depicts the thermal conversion of 1,4-poly(cis-5,6-diacetoxy-1,3-cyclohexadiene) to poly(para-phenylene)

The properties exhibited by poly(TMS-CHD) make it a promising precursor polymer to PPP. FIG. 6 depicts the conversion of poly(TMS-CHD) to the corresponding acetoxy derivative, while FIG. 7 depicts the conversion of the acetoxy derivative to PPP. This latter conversion is known in the art, as evidenced by the Ballard reference cited above.

Poly(TMS-CHD) is a novel polymer and is soluble in a variety of relatively non-polar organic solvents such as benzene, toluene, chlorobenzene, hexanes, THF, ether, chloroform, and methylene chloride. In highly polar solvents such as o-DCB, acetonitrile, alcohols, and water, the polymer is completely insoluble. Although the polymer precipitates out of solution as a fine white powder, it can also form colorless, clear, brittle, glassy films.

Figure 8A:
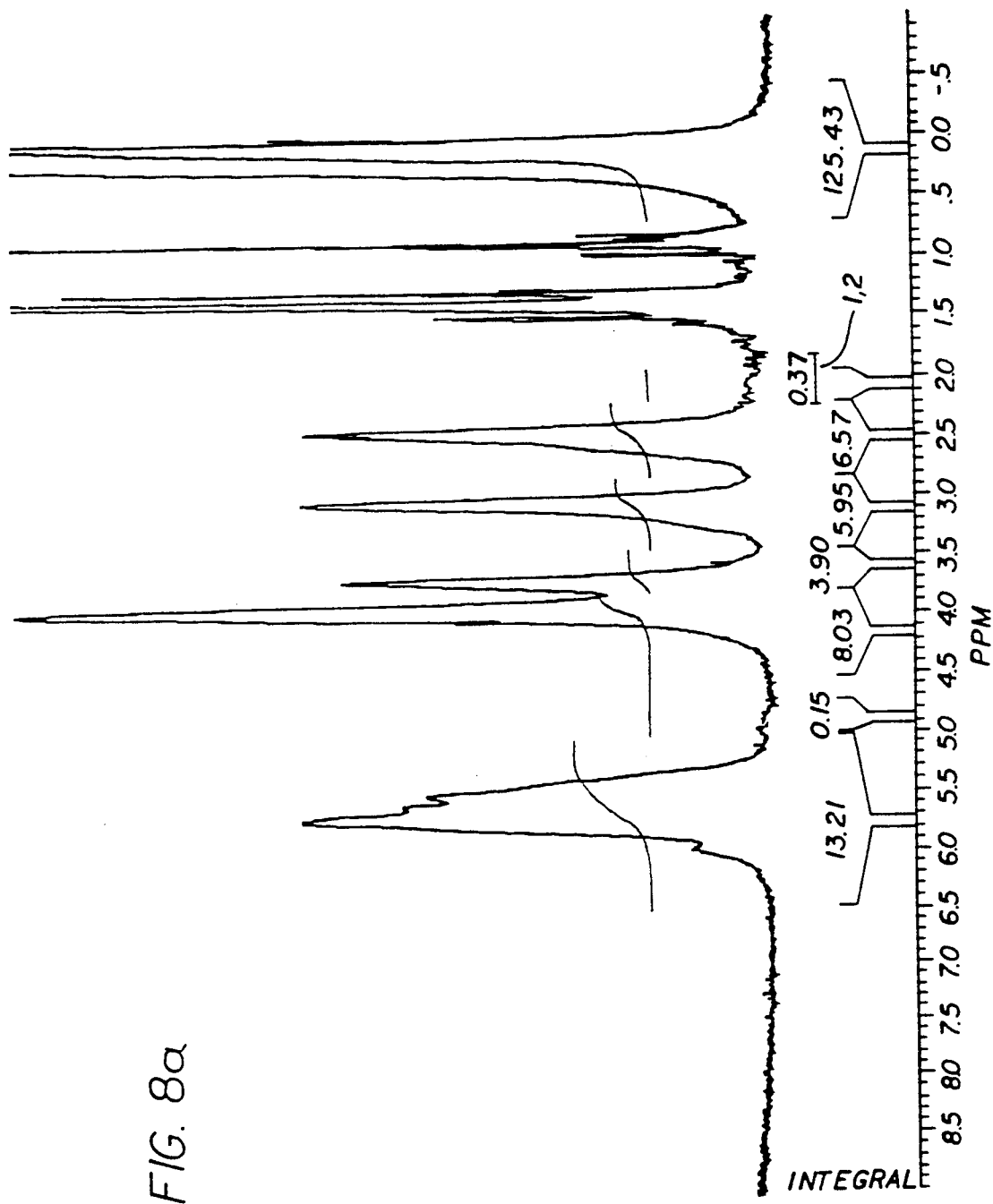
FIG. 8a, on coordinates of signal strength and chemical shift relative to tetramethyl silane, is the 500 MHz $^1$H NMR spectrum of poly(TMS-CHD) prepared with the catalyst (ANiTFA)$_2$.
Figure 8B:
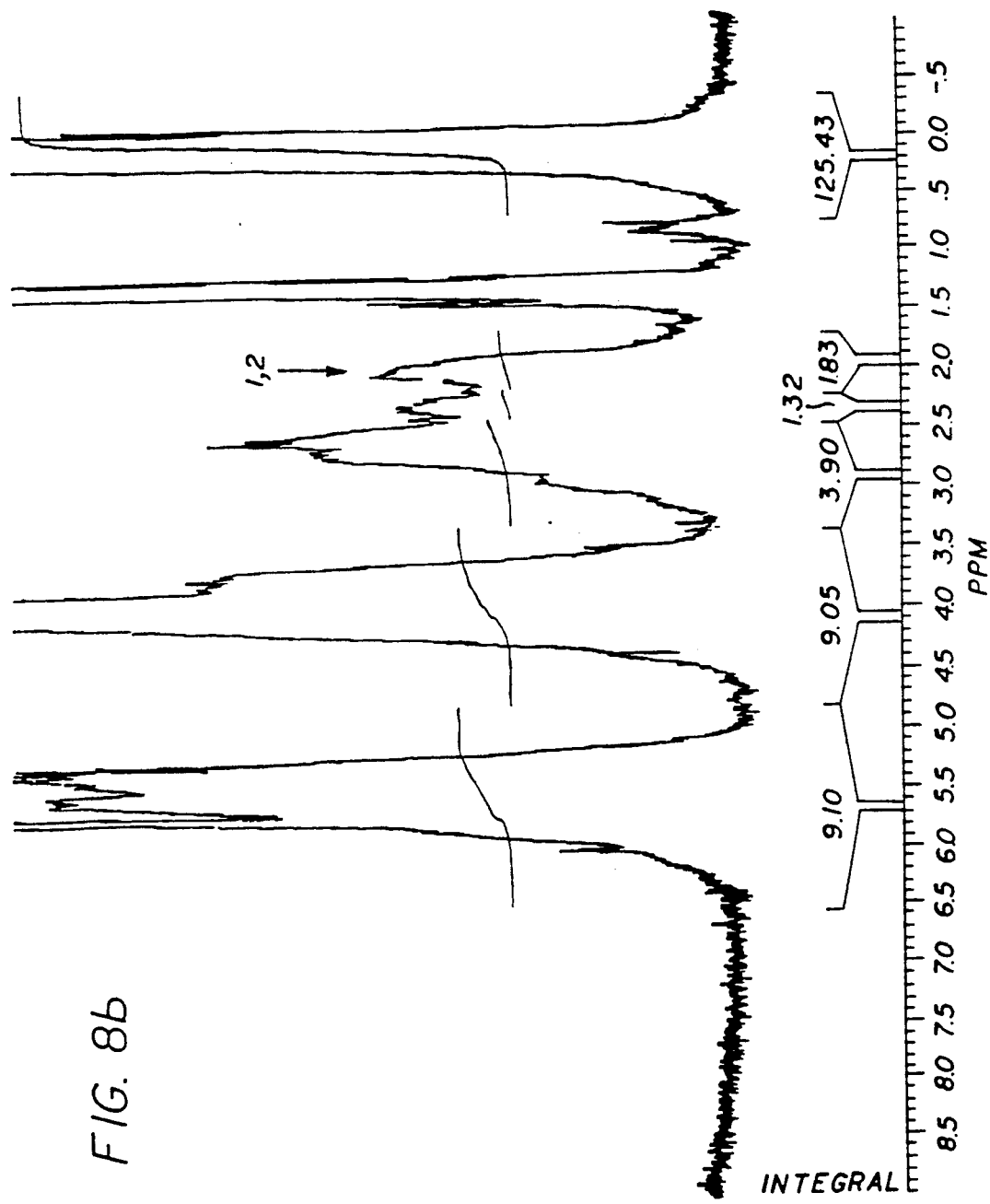
FIG. 8b, on the same coordinates as FIG. 8b, is the 500 MHz $^1$H NMR spectrum of radically polymerized poly(TMS-CHD) for comparison.

The regiochemistry of the poly(TMS-CHD) appears to be almost entirely 1,4-linked, as determined by $^1$H NMR analysis. In particular, it is expected that the presence of 1,2-units in similar polymers would be manifested as a proton signal in the 1.8 to 2.1 ppm range. There is, in fact, an absence of polymer proton signals in this region of the spectrum for poly(TMS-CHD). In contrast, radical polymerization of TMS-CHD only produced short oligomers with a distinct $^1$H NMR signal at 1.9 ppm due to 1,2-linkages (cf. FIGS. 8a and 8b).

Powder X-ray diffraction data provided further evidence that the poly(TMS-CHD) polymer is entirely 1,4-linked and linear.

Conversion of 1,4-poly(cis-5,6-bis(trimethylsiloxy)-1,3-cyclohexadiene) to 1,4-poly(cis-5,6-diacetoxy-1,3-cyclohexadiene) (1,4-poly(DA-CHD) was accomplished by two methods. The first method involved the addition of acetyl chloride to a stirred solution of 1,4-poly(TMS-CHD) and anhydrous zinc chloride or iron (III) chloride, as illustrated in FIG. 6.

Figure 9A:
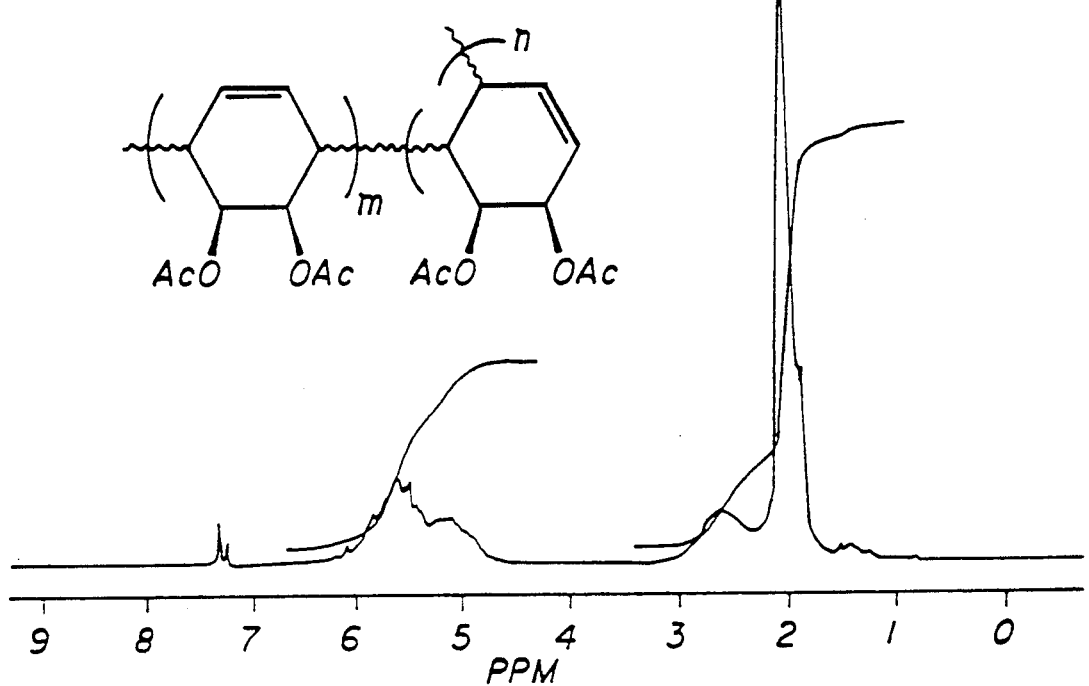
FIGS. 9a and 9b are the comparative 400 MHz $^1$H NMR spectra of poly(DA-CHD) made by radical polymerization and from poly(TMS-CHD), respectively.
Figure 9B:
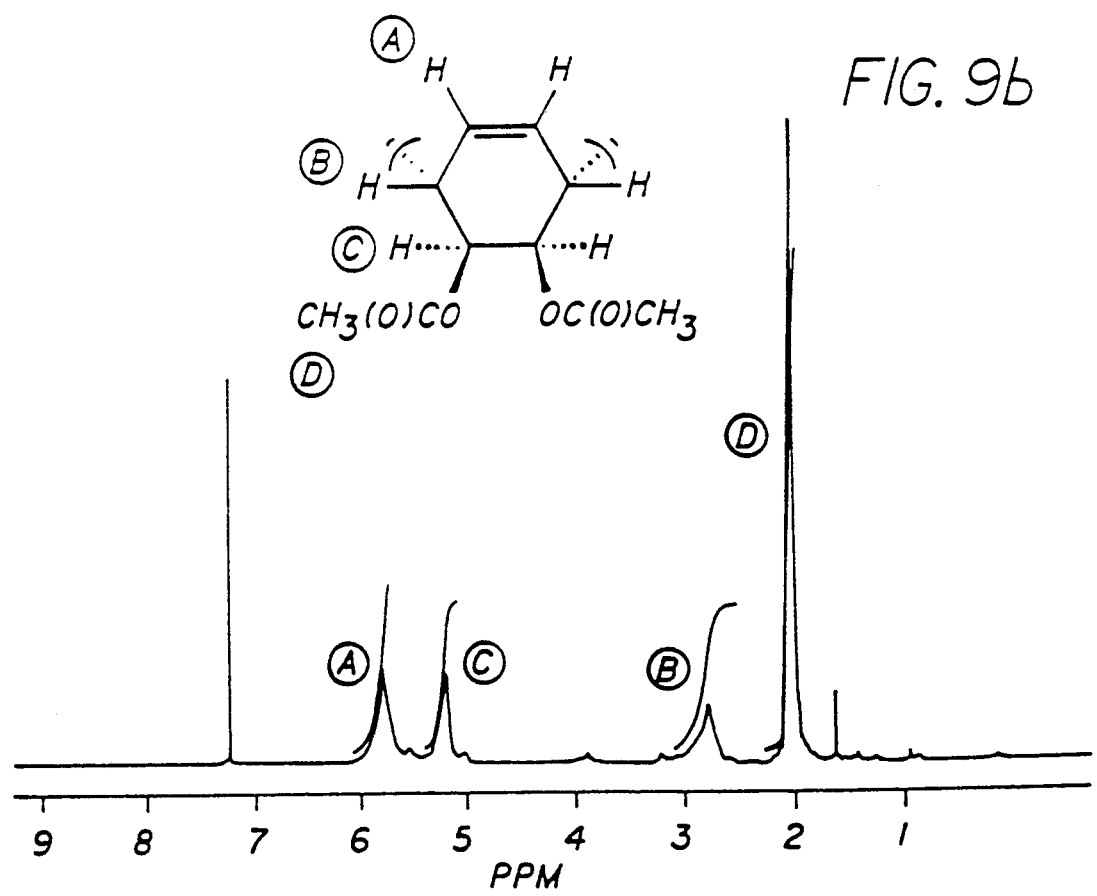
Figure 10A:
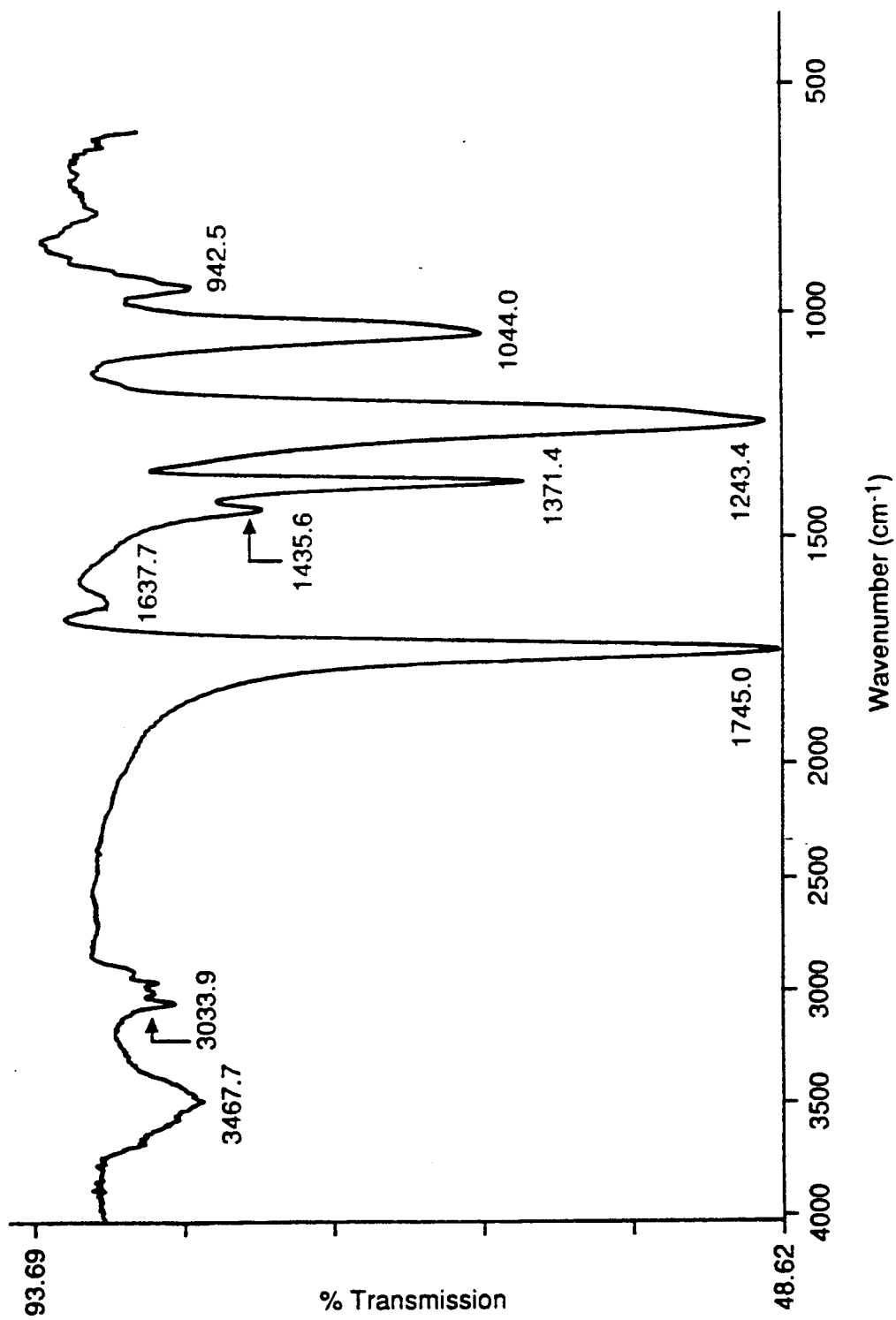
FIG. 10a is the IR spectrum of poly(cis-5,6-diacetoxy-1,3-cyclohexadiene (poly(DA-CHD)) prepared by prior art radical polymerization.
Figure 10B:
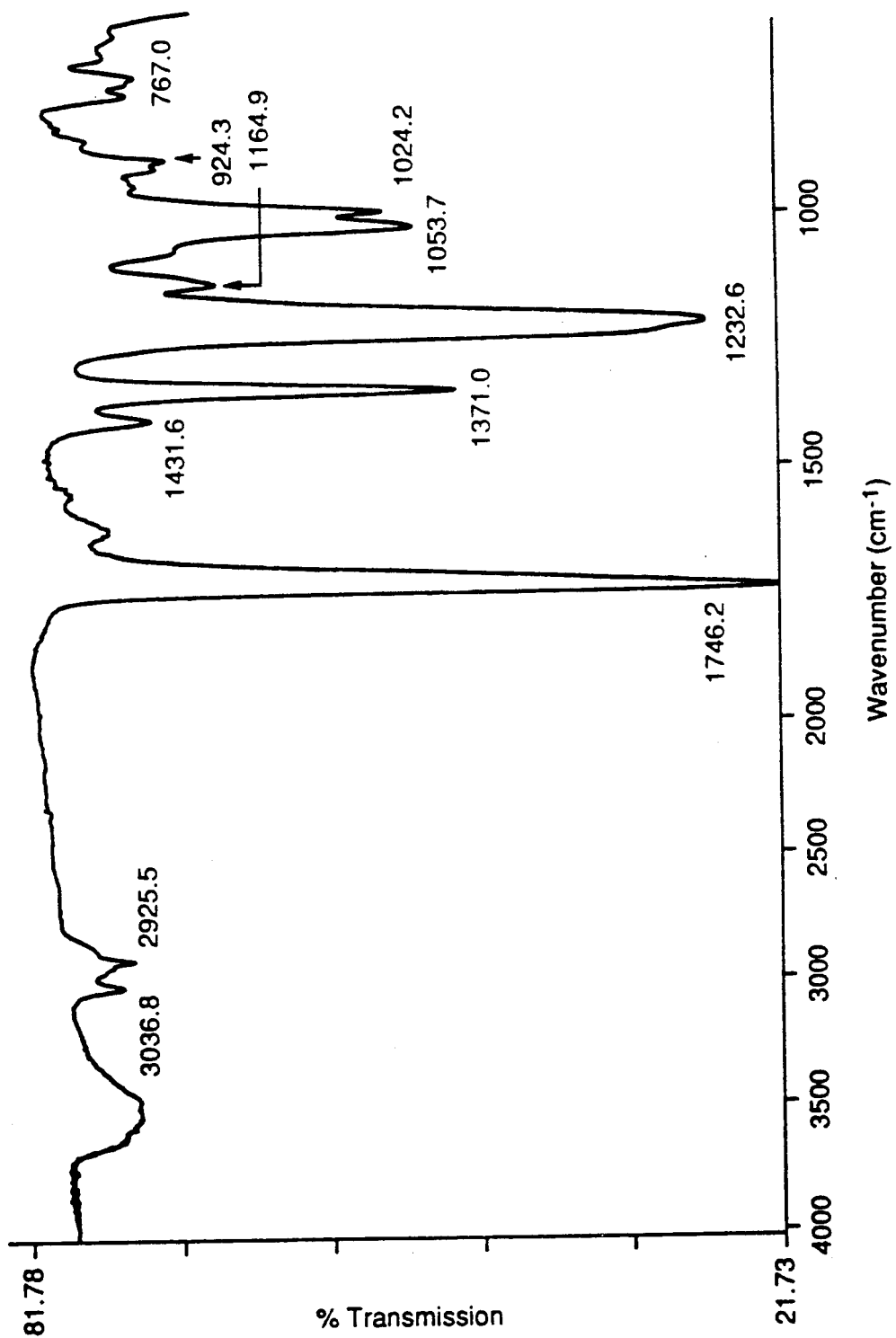
FIG. 10b is the IR spectrum of poly(DA-CHD) prepared from 1,4-poly(TMS-CHD) prior to the retreatment step.
Figure 11A:
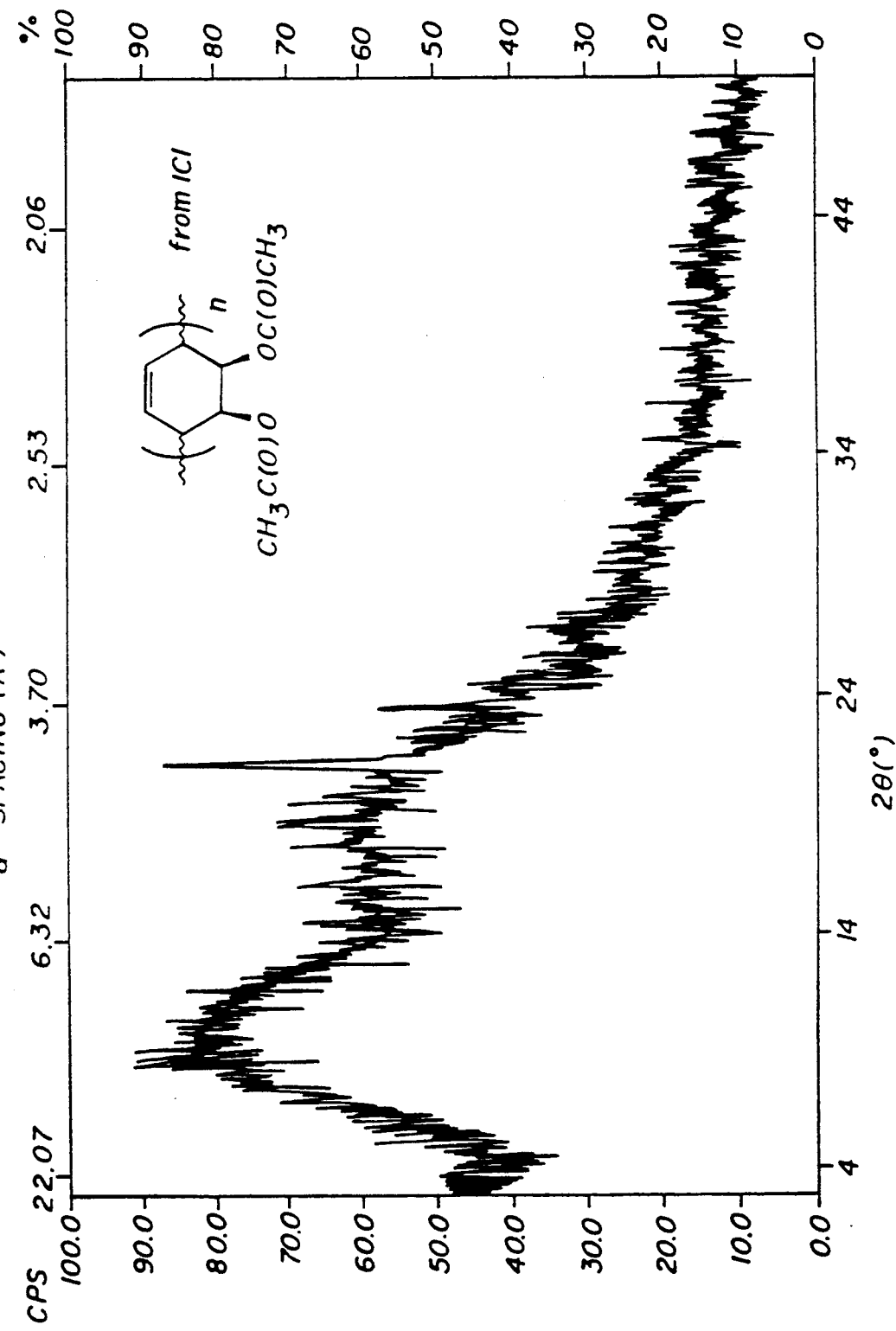
FIGS. 11a and 11b are the comparative powder X-ray data for poly(DA-CHD) made by radical polymerization and from poly(TMS-CHD), respectively.
Figure 11B:
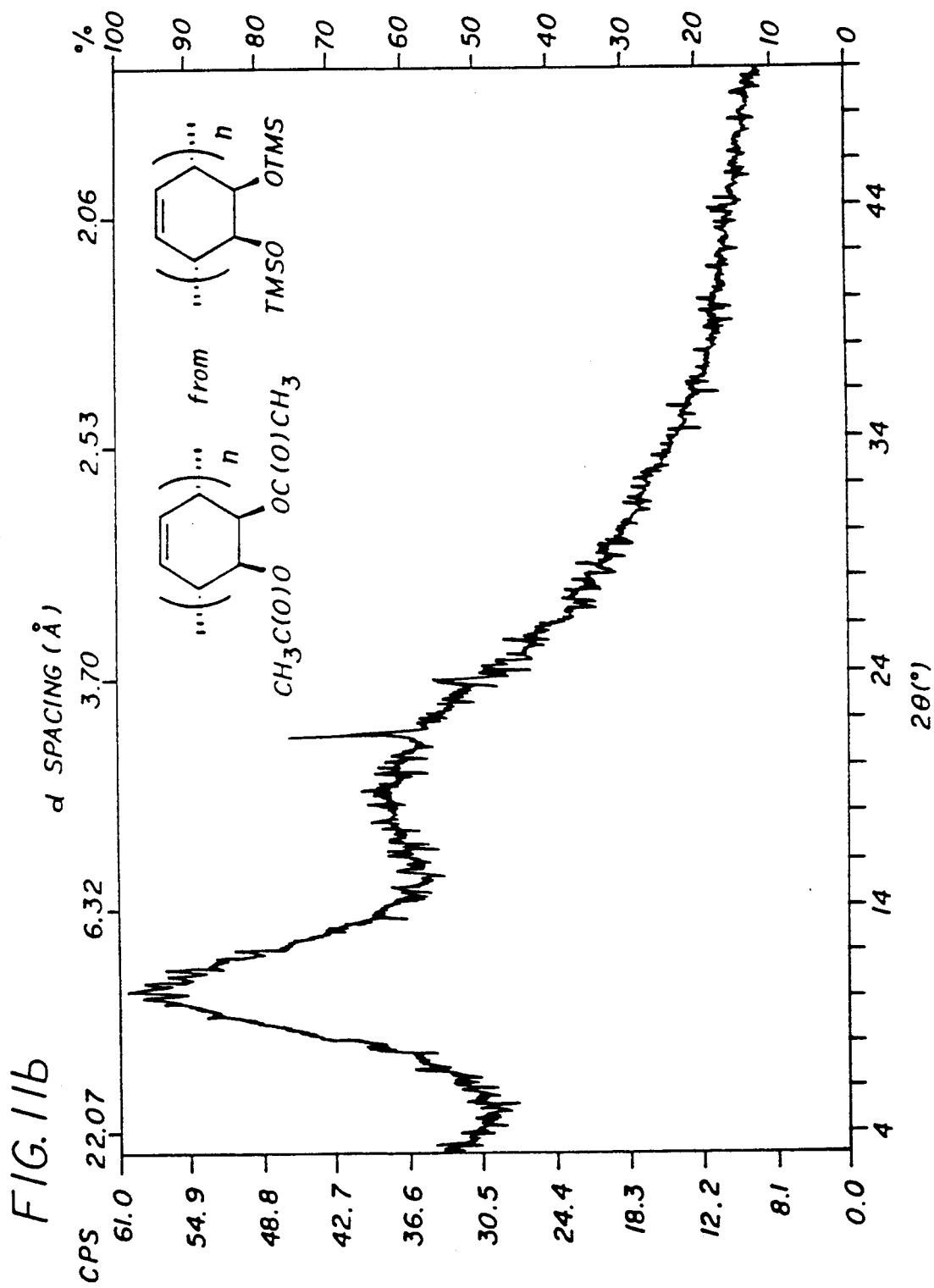
Figure 12:
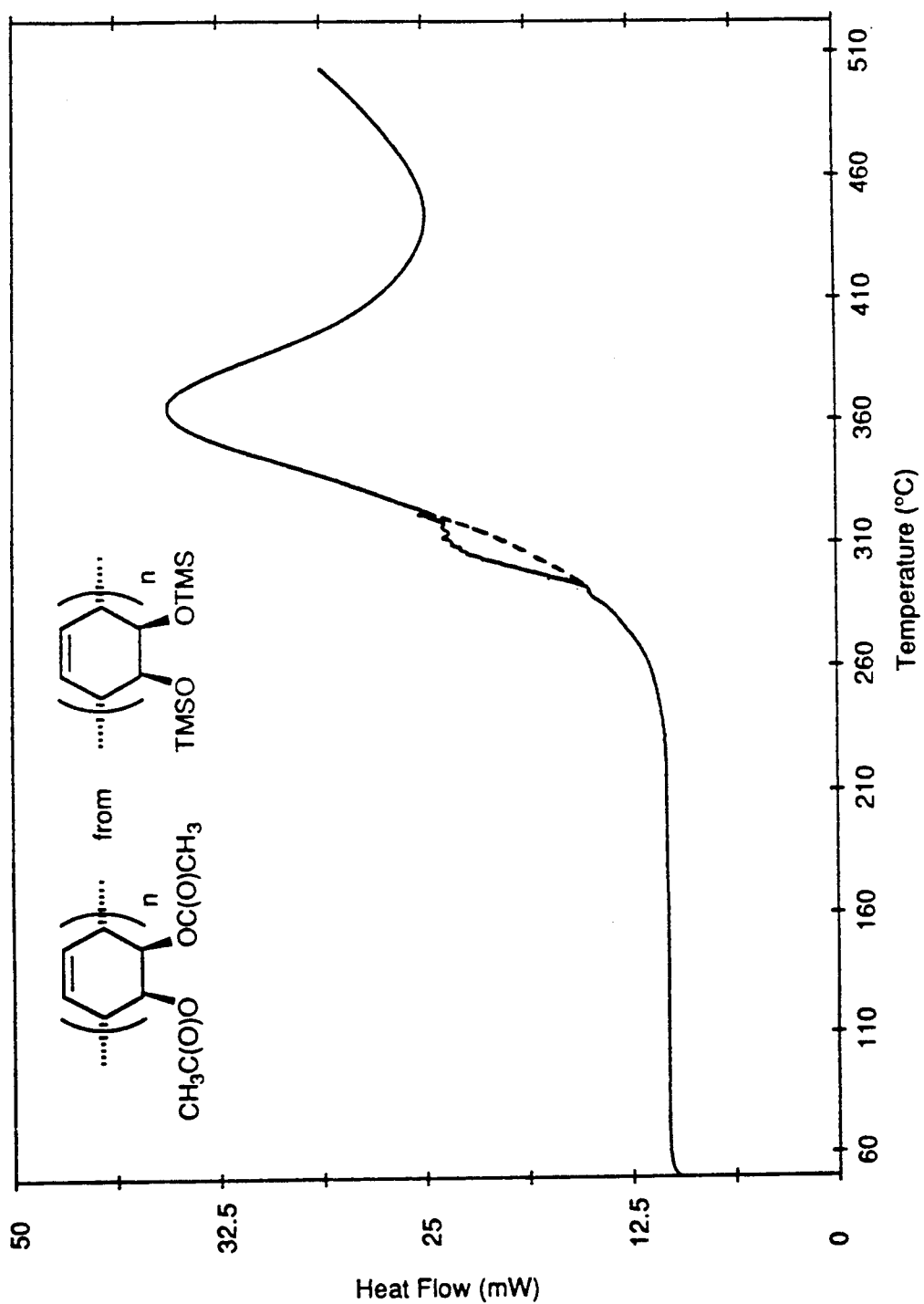
FIG. 12 is the differential scanning calorimetry profile of 1,4-poly(DA-CHD) made from poly(TMS-CHD)
Figure 13:
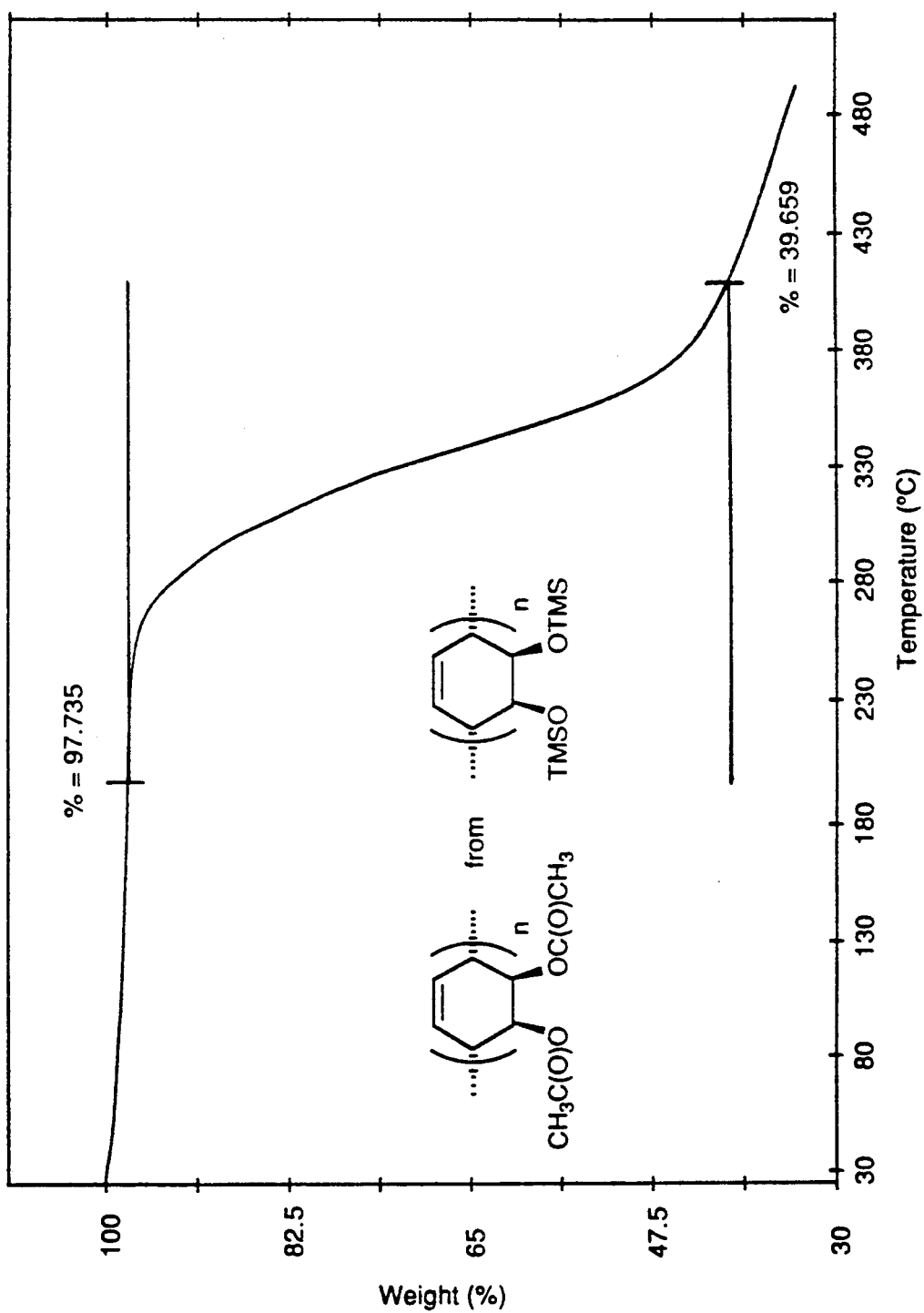
FIG. 13, on coordinates of weight percent and temperature in °C., is a thermogravimetric profile for 1,4-poly(DA-CHD) made from 1,4-poly(TMS-CHD)

This initial procedure yielded 1,4-poly(DA-CHD) with approximately 96% acetoxy functionalities and about 4% hydroxy sidegroups, as revealed by the signal at 3.9 ppm in its $^1$H NMR signal (FIG. 9b) and the O-H stretch at 3470 cm$^{-1}$ in its infrared spectrum (FIG. 10b). The 96% acetylated 1,4-poly(DA-CHD) was further characterized by powder X-ray diffraction (FIG. 11b), differential scanning analysis (DSC) (FIG. 12), and thermogravimetric analysis (TGA) (FIG. 13). FIGS. 9a, 10a, and 11a show the NMR signal, infrared spectrum, and powder X-ray diffractogram, respectively, of the poly(DA-CHD) made by radical polymerization, and are included for comparison purposes.

Figure 14:
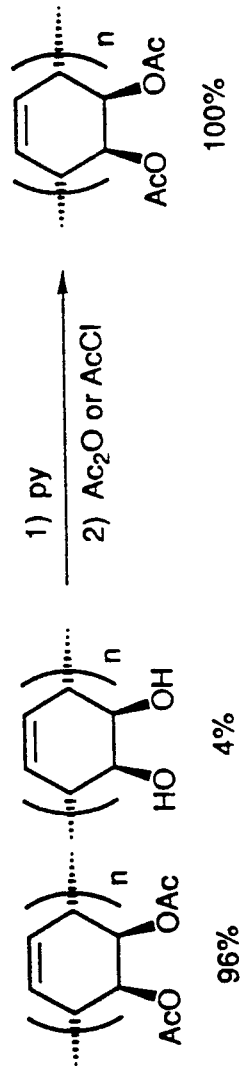
FIG. 14 depicts the reaction scheme of 1,4-poly(DA-CHD) retreatment in accordance with the invention.
Figure 15:
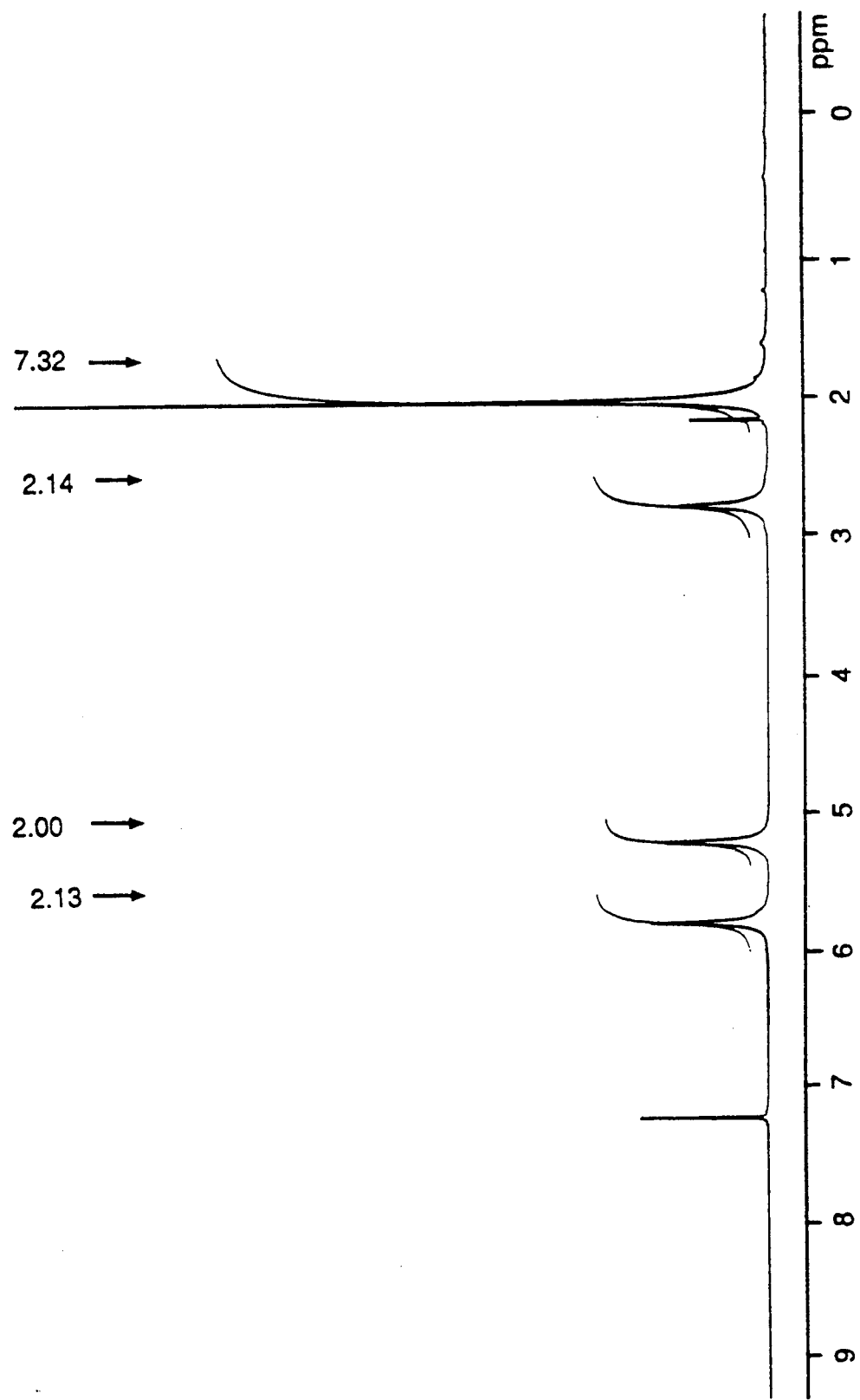
FIG. 15, on coordinates of signal strength and chemical shift relative to tetramethyl silane, is the 500 MHz $^1$H NMR spectrum of fully acetylated 1,4-poly(DA-CHD)
Figure 16A:
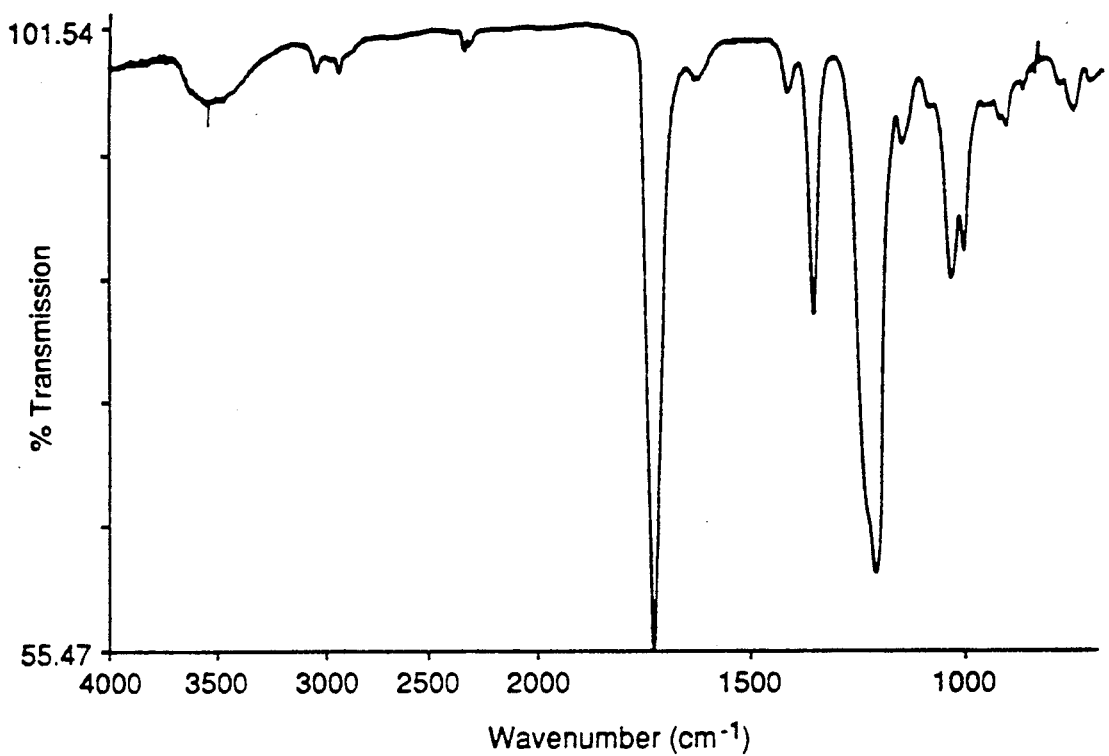
FIG. 16a is the IR spectrum of 1,4-poly(DA-CHD) prior to the retreatment step of the invention.
Figure 16B:
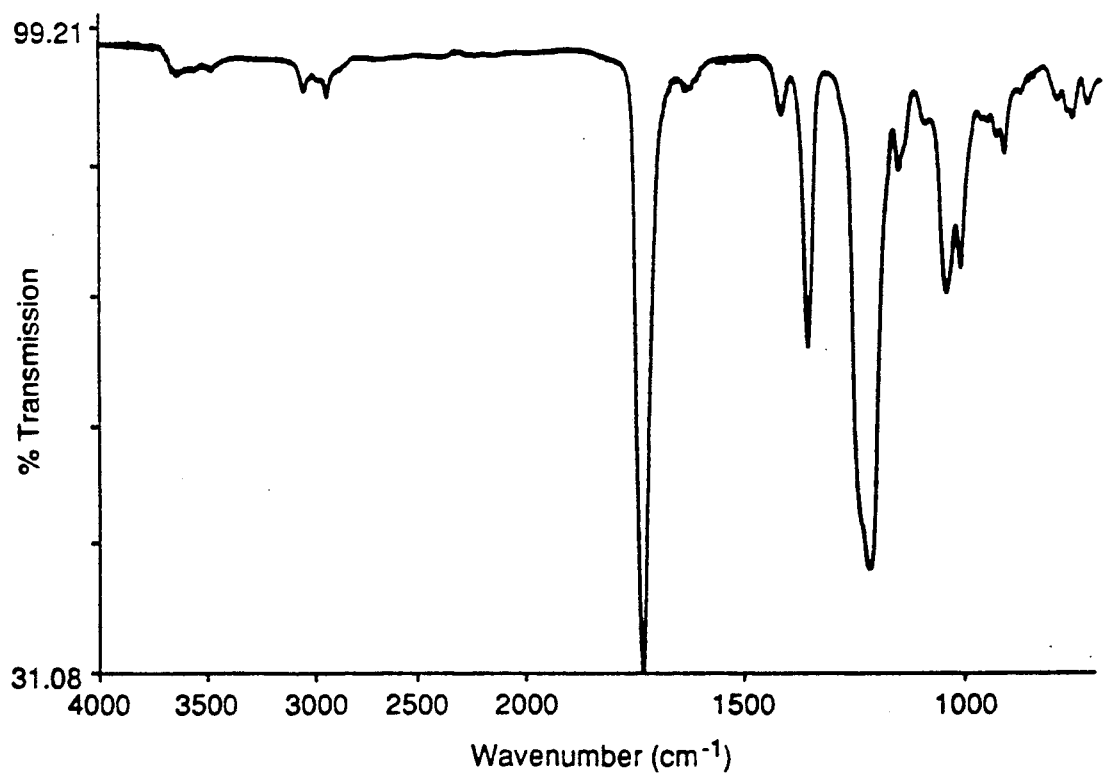
FIG. 16b is the IR spectrum of 1,4-poly(DA-CHD) subsequent to the retreatment step of the invention.

Retreatment of the 96% acetylated polymer with excess pyridine and either acetic anhydride or acetyl chloride yielded the 100% acetylated 1,4-poly(DA-CHD) (FIG. 14). The absence of the proton signal at 3.9 ppm and the overall narrowing of all the polymer proton signals in the $^1$H NMR spectrum illustrates the complete acetylation (FIG. 15). As well, examination of the IR spectra of the 1,4-poly(DA-CHD) before and after retreatment shows a dramatic reduction in the O-H absorbance at $\approx$3500 cm$^{-1}$, which is due to residual hydroxy groups (FIGS. 16a and 16b).

Figure 17:
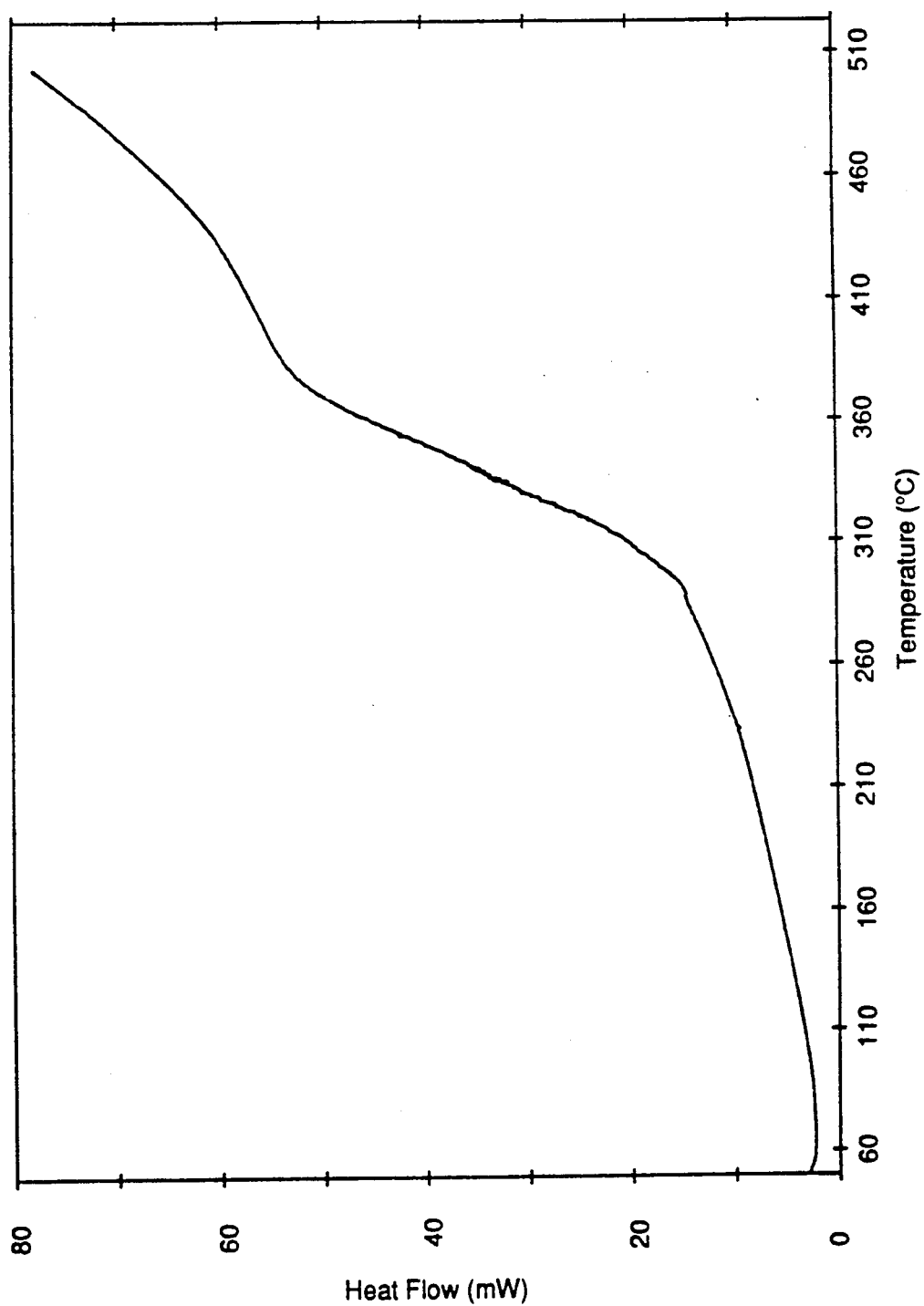
FIG. 17 is the differential scanning calorimetry profile of fully acetylated 1,4-poly(DA-CHD)

The 100% acetylated 1,4-poly(DA-CHD), when compared to the original 96% acetylated polymer, also shows subtle differences by differential scanning calorimetry (DSC). The shoulder transition at $\approx$295° C. on the DSC of the 96% acetylated polymer (FIG. 12) is absent in that of retreated 1,4-poly(DA-CHD) (FIG. 17).

It is believed that this endotherm is not a glass transition (as originally thought), but rather an elimination endotherm due to the residual hydroxy groups. Comparison of molecular weights by gel permeation chromatography of the 1,4-poly(DA-CHD) before and after retreatment revealed it to be unchanged.

The fully acetylated 1,4-poly(DA-CHD) could also be obtained from 1,4-poly(TMS-CHD) by a second process. This second process involved the deprotection of the trimethylsiloxy groups on the 1,4-poly(TMS-CHD) to hydroxy groups, using a fluoride source, such as tetra-butyl ammonium fluoride, and an alcohol. Potassium fluoride with crown ethers and any ammonium salt of fluorine may also serve as a fluoride source. The deprotection reaction can also be accomplished by use of a strong anhydrous acid, such as anhydrous HCl in methanol. While the deprotection reaction is a well-known reaction, it has been utilized in the past primarily on monomeric materials; it has not been efficiently used before on polymers, because performing quantitative substitution on polymers is difficult to do. In the present reaction, 100% acetylation is observed, with almost quantitative isolated yields.

Figure 18:
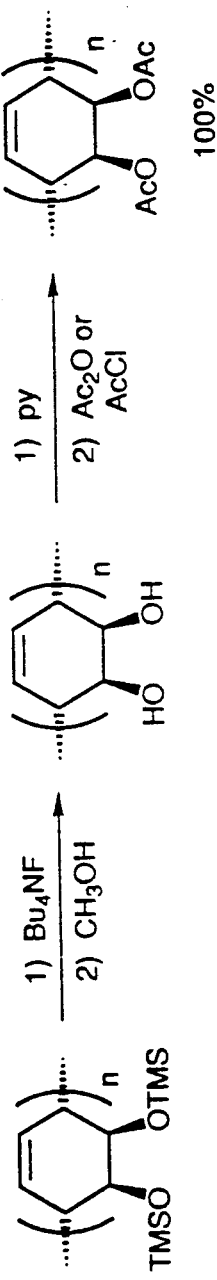
FIG. 18 depicts the reaction scheme of 1,4-poly(DA-CHD) production via 1,4-poly(DH-CHD)
Figure 19:
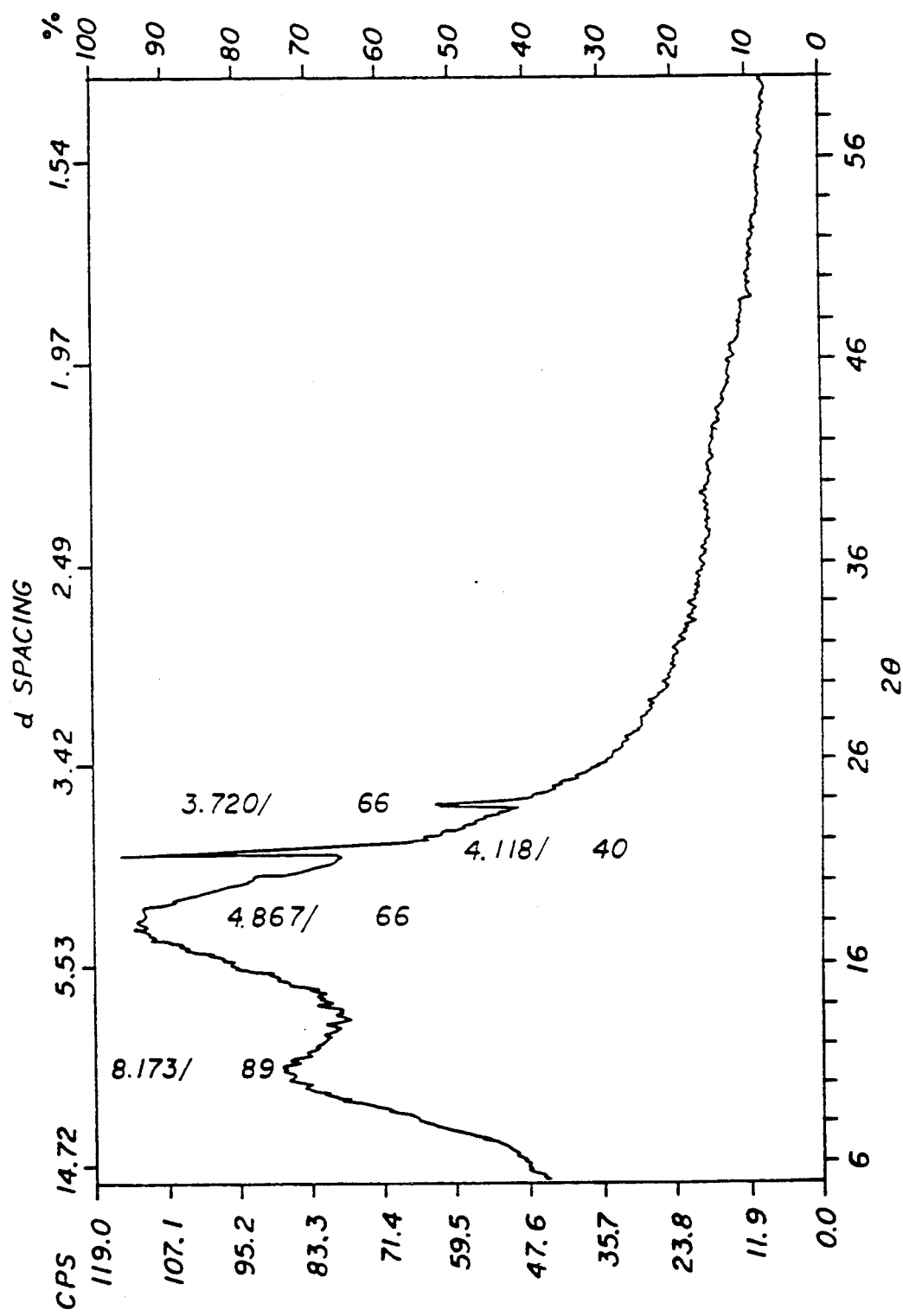
FIG. 19 is the powder X-ray diffraction pattern of fully acetylated 1,4-poly(DA-CHD)

The resulting hydroxy-polymer, 1,4-poly(1,3-cyclohexadiene) [1,4-poly(DH-CHD)], was then treated with pyridine and either acetic anhydride or acetyl chloride to yield the fully acetylated 1,4-poly(-DA-CHD) (see FIG. 18). The 1,4-poly(DA-CHD) obtained by this route is virtually identical in terms of $^1$H NMR and IR spectroscopy and DSC analysis, to the 100% acetylated 1,4-poly(DA-CHD) obtained by the first method. The 100% acetylated 1,4-poly(DA-CHD) made by both methods is amorphous, as revealed by X-ray diffraction (FIG. 19).

The fully acetylated 1,4-poly(DA-CHD) made by the two afore-mentioned methods is intrinsically different from that made using a radical initiator in the prior art. Comparative $^1$H NMR spectroscopy and elimination kinetics of the 100% acetylated 1,4-poly(DA-CHD) made from 1,4-poly(TMS-CHD) and the poly(DA-CHD) made by radical polymerization show marked differences. These differences have their origins in the regular stereo- and regiochemistry of the (ANiTFA)$_2$ catalyzed 1,4-poly(TMS-CHD).

Figure 20A:
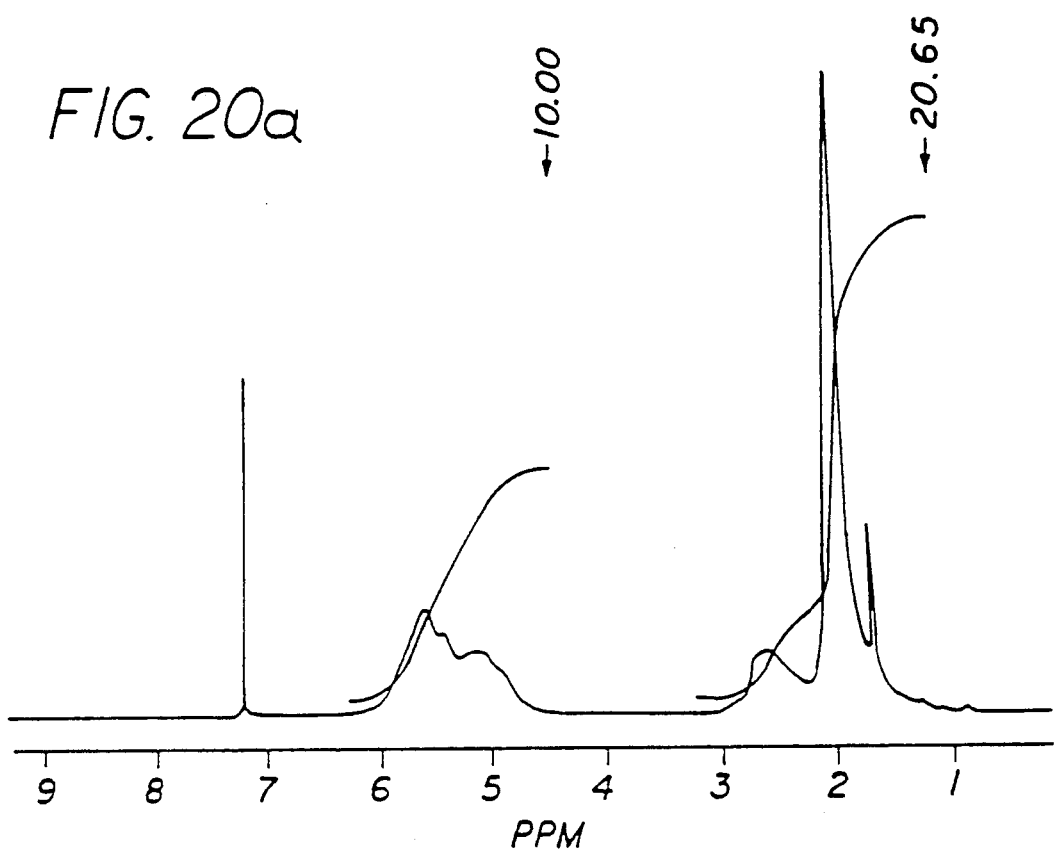
FIG. 20a, on coordinates of signal strength and chemical shift relative to tetramethyl silane, is the 400 MHz $^1$H NMR spectrum of the acetoxy-polymer available from ICI Chemicals and Polymers, United Kingdom.
Figure 20B:
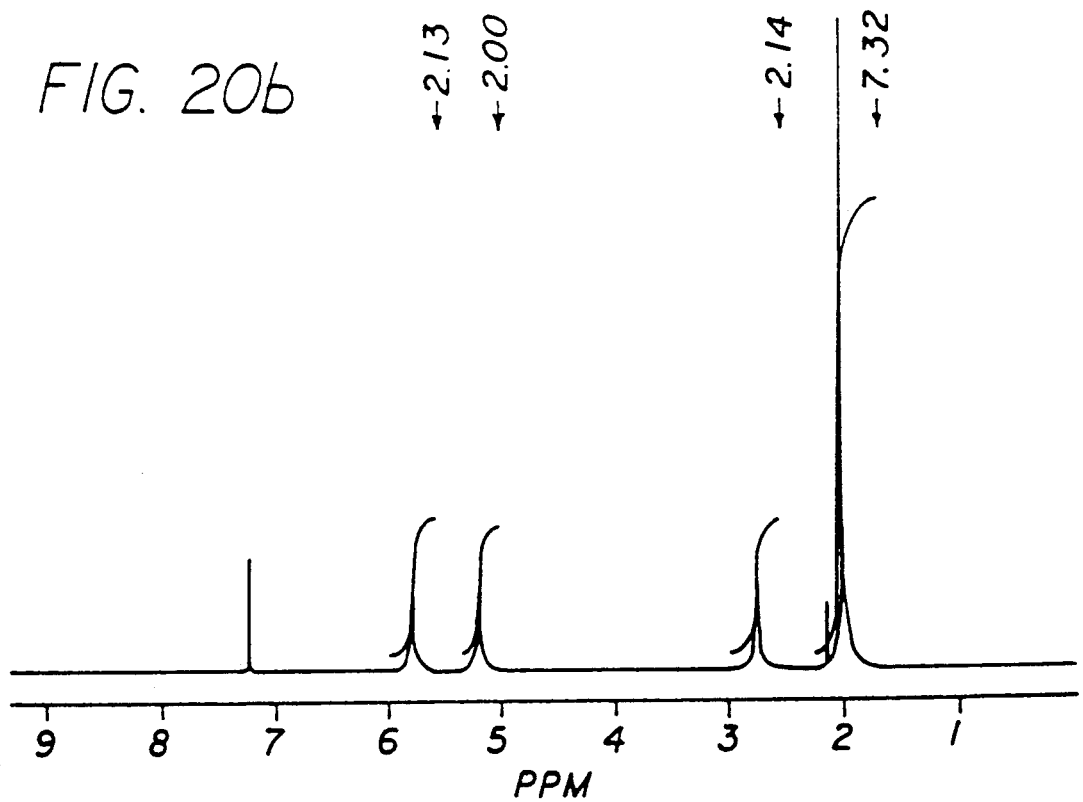
FIG. 20b, likewise on coordinates of signal strength and chemical shift relative to tetramethyl silane, is the 400 MHz $^1$H NMR spectrum of 100% acetylated 1,4-poly(DA-CHD)

In contrast, the radically polymerized poly(DA-CHD) has a random stereochemistry across the cyclohexadienyl repeat units, in addition to having about 10 to 15% 1,2-units. These differences are manifested in the fully acetylated 1,4-poly(DA-CHD) having much sharper and more symmetric signals in the $^1$H NMR spectrum (compare FIGS. 20a and 20b); even though GPC analysis revealed that the polymer made by the process of the invention is about one-half the molecular weight of that made by the radical process.

Figure 21:
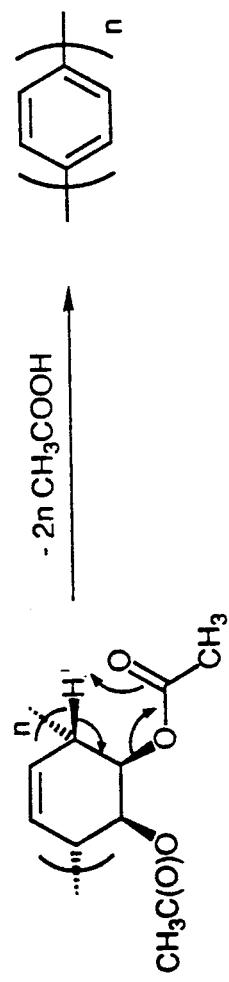
FIG. 21 is the optimum stereochemistry for acetic acid elimination from 1,4-poly(DA-CHD)
Figure 22:
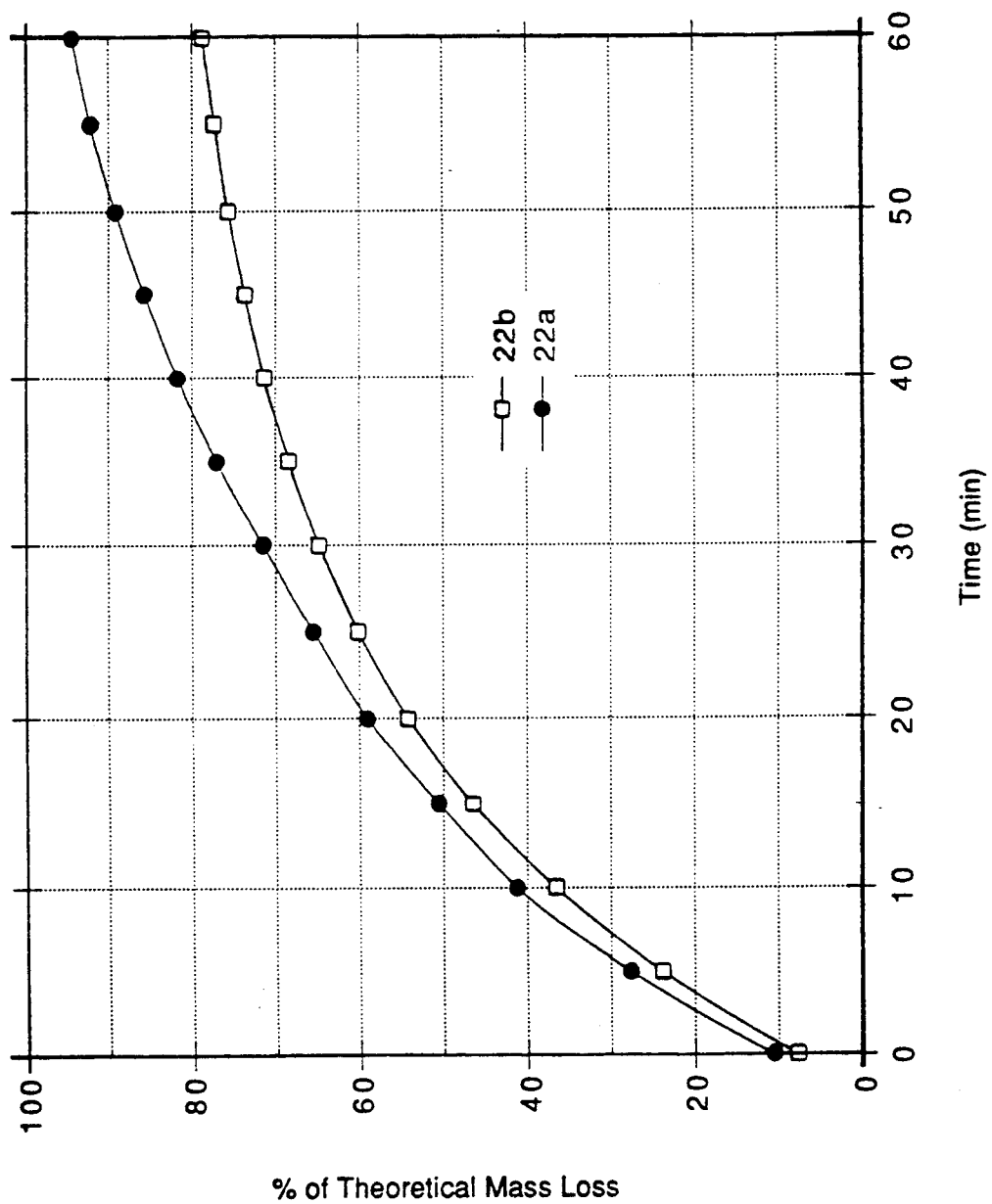
FIG. 22 illustrates the comparative acetic acid elimination kinetics.

The difference in stereoregularity between the two polymers is also evident in the kinetics of their acetic acid elimination processes (FIG. 7). The prior art has revealed that the acetic acid elimination process for PPP formation proceeds through a six-membered ring transition state in which the optimum stereochemistry is such that the acetate group and the proton to be eliminated are in a cis arrangement on the ring (FIG. 21). If the 1,4-poly(DA-CHD) made by the process of the invention has this optimum stereochemistry for facile acetic acid loss, then it should proceed faster than that made by the radical process, which has a random stereochemistry Indeed, this was observed to be the case (FIG. 22). Curve 22a represents the kinetics of acetic acid elimination for 1,4-poly(DA-CHD) made by the process of the invention, while Curve 22b represents the kinetics for 1,4-poly(DA-CHD) made by radical polymerization.

This evidence suggests that the fully acetylated 1,4-poly(DA-CHD) made from 1,4-poly(TMS-CHD) is intrinsically different from the radically polymerized poly(DA-CHD). (It should be noted here that all comparative data herein were performed with a sample of radically polymerized poly(DA-CHD) provided by ICI Chemicals and Polymers, United Kingdom.)

As previously mentioned, the fully acetylated 1,4-poly(DA-CHD) could be converted to poly(para-phenylene) with loss of acetic acid when heated under inert atmosphere in the solid state. Temperatures in the range of about 270° to 340° C. were used, although careful heating between 300° and 310° C. gave the best solid state pyrolysis results.

Figure 23:
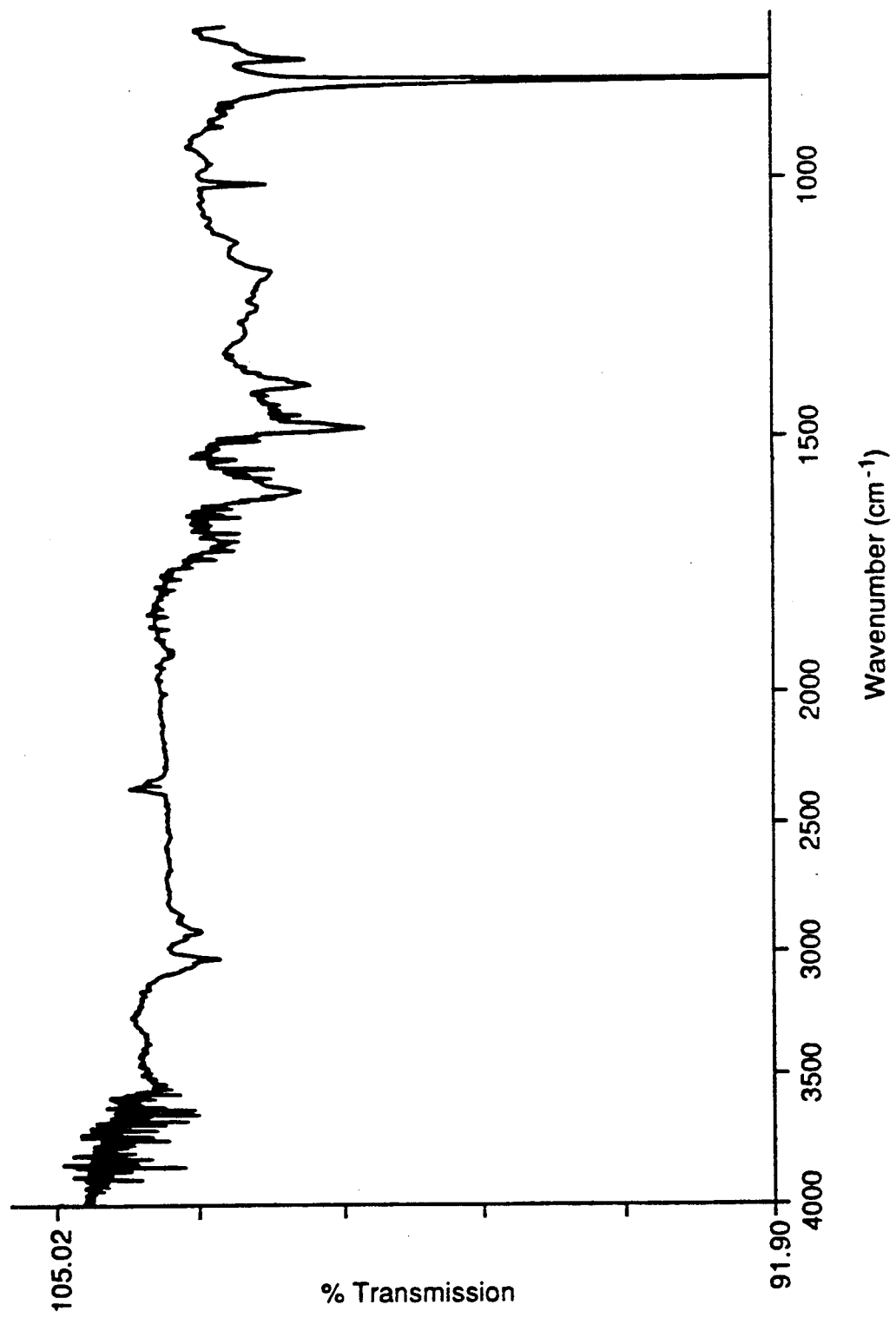
FIG. 23 is the IR spectrum of poly(para-phenylene) obtained from pyrolysis of fully acetylated 1,4-poly(-DA-CHD)
Figure 24:
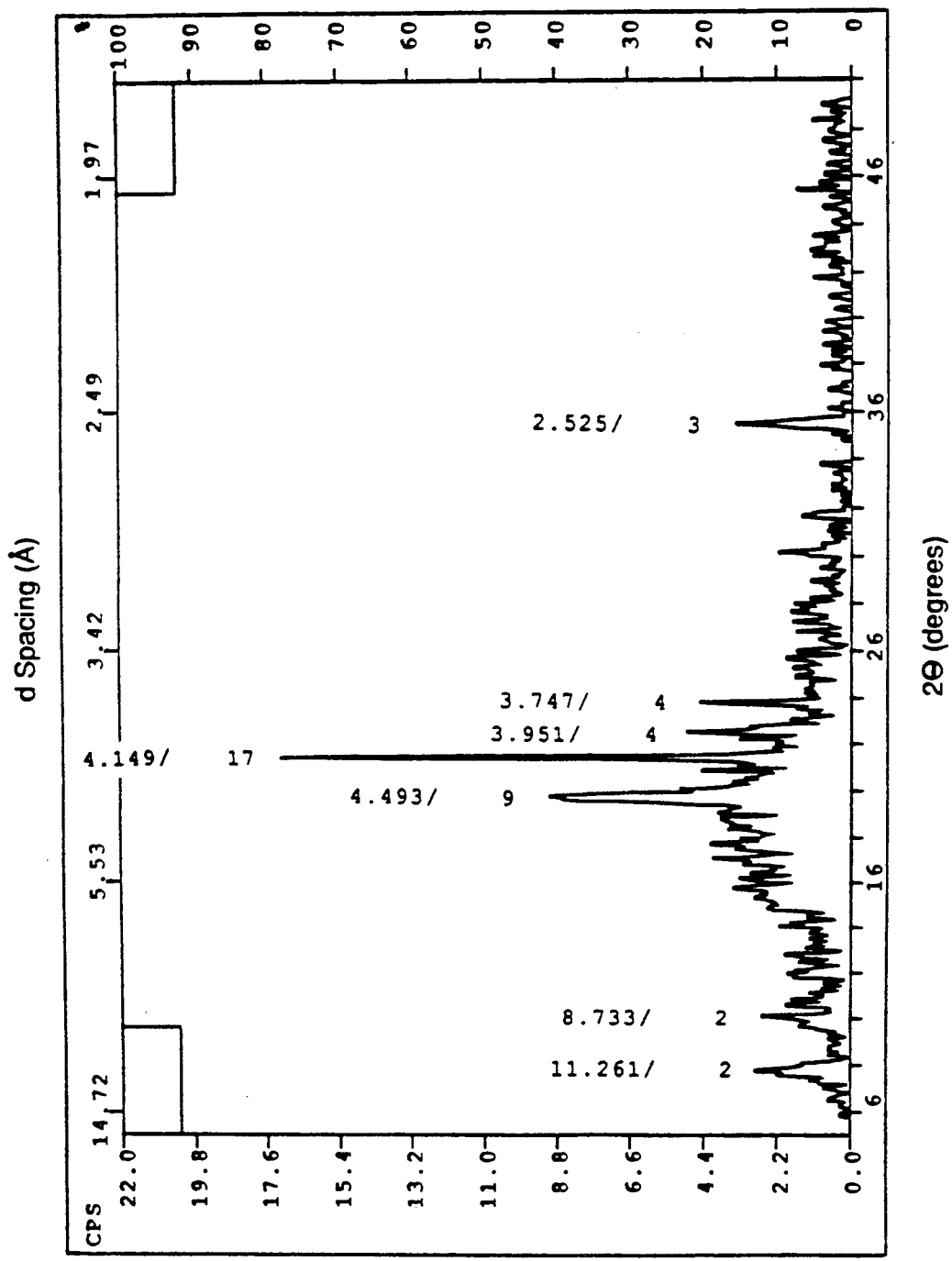
FIG. 24 is the powder X-ray diffraction pattern of crystalline PPP.

The poly(para-phenylene) so formed is a black flaky powder or a shiny black film with a UV/visible absorption maximum at about 310 nm and a strong IR absorbance at 808 cm$^{-1}$ (FIG. 23). Through careful control of the heating conditions, the poly(para-phenylene) can either be amorphous or crystalline (FIG. 24). UV/visible and IR spectroscopy and X-ray diffraction are generally used to characterize poly(para-phenylene), and the values herein compare favorably to those given in the prior art.

Figure 25:
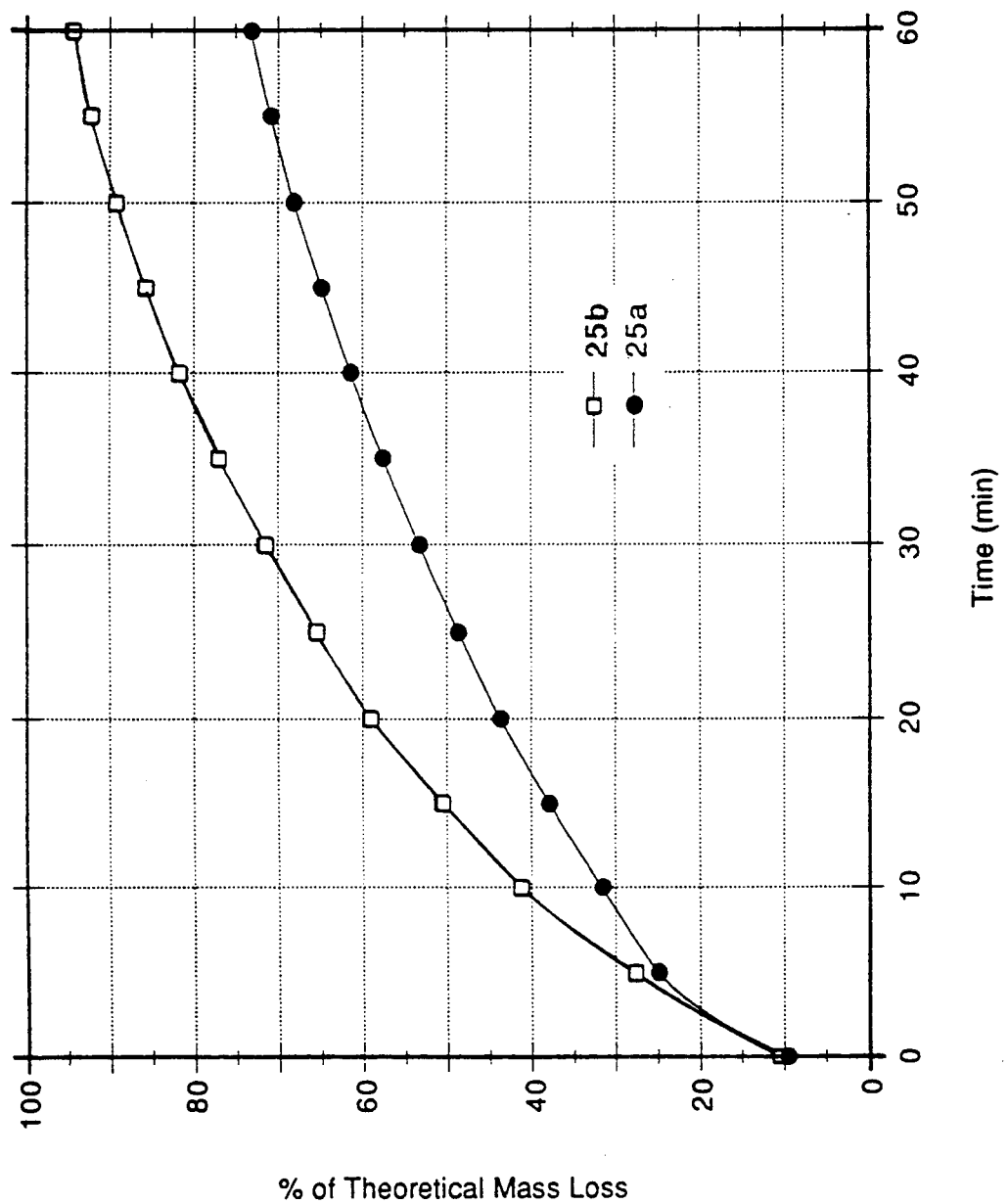
FIG. 25 is the aromatization kinetics of fully acetylated 1,4-poly(DA-CHD) at 305° and 310° C.

FIG. 25 shows typical aromatization kinetics data for the pyrolysis of the fully acetylated 1,4-poly(DA-CHD) at 305° C. (Curve 25a) and at 310° C. (Curve 25b).

In summary, (ANiTFA)$_2$ and related allyl-nickel catalysts can polymerize derivatives of 1,3-cyclohexadiene in a 1,4-fashion, so long as the functional groups do not coordinate to the catalyst, or are not easily eliminated. The trimethylsiloxy derivative is compatible with these catalysts. The resulting polymer appears to be entirely 1,4-linked. It is soluble in non-polar solvents and ordered in the solid state. The polymer can be easily converted by two methods to another precursor polymer which is pyrolyzed to form poly(para-phenylene), as described above.

INDUSTRIAL APPLICABILITY

Poly(TMS-CHD) can be converted to 1,4-poly(cis-5,6-diacetoxy-1,3-cyclohexadiene), which has been shown in the prior art to be a precursor to poly(para-phenylene). The resulting high regioselectivity (substantially 100% 1,4-linkages) results in highly improved mechanical properties of the final polymer. Further, the catalysts bis[(allyl)trifluoroacetatonickel(II)], bis[(allyl)pentafluorophenoxynickel(II)], and bis[(allyl)iodonickel(II)] may be employed to polymerize substituted cyclohexadienes.

EXPERIMENTAL

General Considerations

All manipulations of air- and/or water-sensitive compounds were performed using conventional high vacuum or Schlenk techniques. Argon was purified by passage through columns of BASF R3-11 catalyst (Chemlog) and 4 Å molecular sieves (Linde). Solid organometallic compounds and organic monomers were transferred and stored in a nitrogen filled Vacuum Atmospheres drybox. NMR spectra were recorded on a JEOL GX-400 (399.95 MHz $^1$H, 100.40 MHz $^{13}$C spectrometer. In-frared spectra were recorded with a Perkin-Elmer 1600 se-ries FT-IR spectrometer. Gel permeation chromatograms were obtained on a Waters 150C ALC/GPC using toluene at a flow rate of 1.0 ml/min and a column temperature of 35° C.; or on a custom system consisting of three Styragel columns, an Altex Model 110A pump, and a Knauer differential refractometer using methylene chloride as the eluant at a flow rate of 1.5 ml/min at room temperature Powder X-ray diffraction studies were performed on a Guinier camera with a camera constant of 0.358278 deg/mm or a Scintag diffractometer, using CuKα radiation. Differential scanning calorimetry was performed on a Perkin-Elmer DSC-7, and thermogravimetric analysis was performed on a Perkin-Elmer TGS-2.

Pentane, n-heptane, benzene, diethyl ether, THF, and DME were vacuum transferred from sodium benzophenone ketyl. Methylene chloride was vacuum transferred from $P_2O_5$. Chlorobenzene was distilled, dried over molecular sieves, and filtered through activated alumina. Ortho-dichlorobenzene was distilled from calcium hydride at 20 Torr. Pyridine and triethylamine were both distilled from calcium hydride. Chlorotrimethylsilane was distilled from magnesium filings. Allyl trifluoroacetate was prepared by refluxing allyl alcohol and trifluoroacetic acid in a Dean-Stark apparatus and purified by distillation. 1,3-Butadiene was purified by condensation of the gas onto calcium hydride at $-78°$ C., and degassed by repeated freeze-pump-thaw cycles. 1,3-Cyclohexadiene was distilled from sodium borohydride. Cis-5,6-dihydroxy-1,3-cyclohexadiene was obtained from Aldrich Chemical and recrystallized from ethyl acetate and pentane prior to use. The acetyl and methoxycarbonyl derivatives were obtained from ICI and used as was. All monomers were stored in anhydrous, sub-zero conditions.

All distillations were performed under argon. All solvents and liquid reagents were degassed by repeated freeze-pump-thaw cycles and stored under argon in Kontes flasks. Solid phase reagents and monomers were degassed in vacuo and stored in the drybox prior to use.

Preparation of (ANiTFA)$_2$ Catalyst 1.00 g (3.64 mmol) of Ni(1,4-cyclooctadiene)$_2$ (Ni(COD)$_2$; freshly recrystallized from toluene) was crushed with a mortar and pestle. The yellow powder was suspended in approximately 20 ml of rapidly stirred diethyl ether and then added in approximately 5 ml aliquots to 1.12 (7.27 mmol) of allyl trifluoroacetate at 0° C. The resulting deep red mixture was stirred for 1½ hours at 0° C., or until all of the yellow Ni(COD)$_2$ was consumed. The resulting clear red solution was then cannula-filtered through a plug of glass microfibre disk, and three-quarters of the solvent was pumped off while the mixture remained at 0° C. The resulting brown-red slurry was washed with 2×10 ml aliquots of pentane at $-78°$ C., the supernatant was drawn off to yield an orange-brown powder, which was dried in vacuo overnight at 0° C. (yield 0.560 g; 72.4%).

Analysis: $^1$H NMR ($C_6H_6$): 4.80–5.30 ppm (1H), 2.45 ppm 2H), 1.60–1.90 ppm (2H).

Preparation of
Cis-5,6-bis(trimethylsiloxy)-1,3-Cyclohexadiene 2.02 g (18.9 mmol) of cis-5,6-dihydroxy-1,3-cyclobutadiene and a few grains of 4-(N,N-dimethyl amino) pyridine (4-DMAP) were dissolved in a mixture of approximately 80 ml of methylene chloride and 4.32 ml (52.0 mmol) of pyridine. While rapidly stirring under argon with the temperature moderated with a room temperature water bath, 4.27 g (39.0 mmol) of trimethylchlorosilane, diluted with a few ml of methylene chloride, was added dropwise to the pale yellow solution. After stirring for 1½ hrs at room temperature, the resulting cloudy white suspension was diluted with 10 ml of pentane to completely precipitate out the pyridinium hydrochloride salts. The salts were removed by filtration through a medium porosity frit. The solvent was removed from the filtrate in vacuo to yield a pale yellow oil. Vacuum distillation of the oil in a short path distillation apparatus yielded 3.92 g (84.8%) of a viscous, colorless, clear liquid (bp: 47° C. at 2 μm Hg pressure). $C_6H_6(OTMS)_2$: $^1$H NMR ($C_6D_6$) 5.73–5.88 ppm (4H); 4.12 ppm (2H); 0.14 ppm (18H).

Polymerizations and Copolymerizations of Cis-5,6-Dihydroxy-1,3-Cyclohexadiene Derivatives Approximately 0.010 g ($2.35\times10^{-5}$ mol) of (ANiTFA)$_2$ was weight out in a vial in a drybox, and then dissolved in 2.3 ml of solvent to give a clear orange solution. This solution was passed through a 0.5 micron Millipore filter, and then injected into a 50 ml capacity, thick walled glass Schlenk bomb with a 8 mm Kontes valve. The appropriate amount of liquid monomer was then passed through a plug of basic alumina and added to the reaction vessel. In the case of the CHD homopolymerizations and copolymerizations, about 470 to 480 equivalents of monomer to catalyst were added in total. For the TMS-CHD polymerizations, about 50 to 200 equivalents were added. Solid monomers were added by a powder funnel, while liquid monomers were added by syringe or pipet in the drybox. In the case of copolymerizations, the more reactive monomer was always added before the less active one. The polymerization mixture was degassed by repeated freeze-pump-thaw cycles and then backfilled with argon. After heating in a 50° C. oil bath with rapid stirring for 24 hours, the mixture was poured into about 30 to 50 ml of a solvent in which the polymer was insoluble (usually, methanol). The polymer was isolated by suction filtration, redissolved in a minimum amount of solvent if possible, and then re-isolated by the same method. The final product was dried in vacuo to yield a fine white powder.

1,4-PCHD (88.4% yield in o-dichlorobenzene): $^1$H NMR ($C_6D_6$): 5.6–5.8 ppm (2H); 1.9–2.1 ppm (2H); 1.4–1.7 ppm (4H).

Copolymers of Various Compositions of CHD and BMC-DHCD $^1$H NMR (CDCl$_3$): 5.4–5.9 ppm (olefinic protons); 3.6–3.9 ppm (methoxycarbonyl protons); 1.2–2.1 ppm (allylic and methylene protons).

Poly(TMS-CHD)

(93% yield with 1.5 M TMS-CHD and monomer:catalyst ratio=80:1, in chlorobenzene)

$^1$H NMR ($C_6D_6$): 5.1–6.7 ppm (2H); 3.8–4.4 ppm (2H); 3.2–3.6 ppm (1H); 2.4–2.9 ppm (1H); 0.0–0.8 ppm (18H).

| Elemental Analysis: | Expected | C 56.19 | H 9.43 | Si 21.90 |
|---|---|---|---|---|
| $C_{12}H_{24}O_2Si_2$ | Actual | C 55.91 | H 9.34 | Si 22.21. |

Preparation of
1,4-Poly(cis-5,6-diacetoxy)-1,3-cyclohexadiene)

A 50 ml Schlenk flask with an 8 mm Kontes valve was charged with 1,4-poly(cis-5,6-bis(trimethylsiloxy)-1,3-cyclohexadiene) (149.5 mg; 0.583 mmol) and anhydrous zinc chloride (167 mg; 1.23 mmol) in a nitrogen-filled glove box. On a Schlenk line, dry, degassed diethyl ether (10 ml) was added via syringe under Ar flush to the reaction vessel. The mixture was stirred for 0.5 hr to completely dissolve the ZnCl$_2$. Then, distilled and degassed acetyl chloride (350 μl; 6.19 mmol) was added via syringe as a neat liquid to the clear, colorless solution under Ar flush. The mixture immediately became cloudy, and a pale yellow, gelatinous solid gradually precipitated with stirring over an 18 hr period. Subsequently, the reaction mixture was decanted into methanol (100 ml) to precipitate the polymer. A colorless powder was isolated by filtration and washed with methanol (20 ml). Vacuum-drying of this solid (<10 μm Hg, 1 hr) afforded 87 mg (76% yield) of 1,4-poly(-cis-5,6-diacetoxy-1,3-cyclohexadiene). This polymer was purified by dissolution in the minimal amount of dichloromethane, filtration, and re-precipitation into hexanes (100 ml). The resulting colorless powder was dried vacuo for 12 hr.

Analysis: $^1$H NMR (400 MHz, CDCl$_3$): δ 5.88 (s,2H), 2.82 (s,2H), 2.07 (s,2H), 2.07 (s,6H). $^{13}$C NMR (100 MHz, CDCl$_3$): δ 170, 127, 71, 37, 21.5. IR (KBr mull): cm$^{-1}$ 3037, 2932, 1746, 1644, 1434, 1372, 1240, 1166, 1053, 1026, 928, 768.

Anhydrous ferric chloride (FeCl$_3$) can also be used in place of ZnCl$_2$ under the same reaction conditions for the conversion of 1,4-poly(cis-5,6-(trimethylsiloxy)-1,3-cyclohexadiene) to 1,4-poly(cis-5,6-diacetoxy-1,3-cyclohexadiene). However, after the 1,4-poly(TMS-CHD), FeCl$_3$, and acetyl chloride have been stirring in diethyl ether for ½ hr, the reaction mixture must be quenched in methanol and worked up as in the ZnCl$_2$ case to prevent further reaction of the FeCl$_3$ with the 1,4-poly(DA-CHD) formed.

In addition, treatment of 1,4-poly[cis-5,6-bis(trimethylsiloxy)-1,3-cyclohexadiene] with two equivalents of iodotrimethylsilane in dimethyl ether resulted in the quantitative displacement of the trimethylsiloxy group and formation of a new polymeric material with the postulated structure 1. The further formation of this product, cis-1,4-poly(5,6-diiodo-1,3-cyclohexadiene), and its potential for conversion to poly(para-phenylene) are under study.

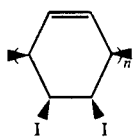

1

Synthesis and Polymerization of 5-methyl-1,3-cyclohexadiene 12.5 g (0.130 moles) of (±)4-methyl-1,3-cyclohexadiene (99.7%, Wiley Organics) was dissolved in 30 ml of carbon tetrachloride and 1 5 ml of absolute ethanol in a 250 ml B14/20 3-neck round bottom flask. Under an argon flush, 18.00 g (0.113 moles) of bromine diluted with 15 ml of CCl$_4$ was added dropwise to the reaction mixture at −5° C. At the end of the addition, a simple distillation apparatus was attached and excess starting olefin was distilled off at 103° C. The dark residue was separated by fractional distillation at 0.1 Torr. The product, 1,2-dibromo-4-methyl cyclohexane, was collected at 50° to 51° C. in 83.0% yield (24.02 g).

10.00 g (0.039 moles) of 1,2-dibromo-4-methylcyclohexane was added dropwise to a mixture of sodium isopropoxide at 100° to 110° C. (The isopropoxide mixture was made by adding 2.08 g of NaH to 11.7 ml of dry isopropanol and 19.5 ml of triethylene glycol dimethyl ether under an argon flush.) The low boiling fraction (product and isopropanol) was isolated by distillation from the reaction mixture at 75° to 78° C., using a dry ice/isopropanol cold trap. The isopropanol was removed by washing the distillate with water and drying the organic layer over calcium hydride. 0.60 g (16.34%) of a colorless, clear liquid was isolated by vacuum transfer:

$^1$H NMR (CDCl$_3$): 1.0 ppm (3H); 1.5–2.8 ppm (5H); 5.5–5.9 ppm (4H).

In the drybox, 0.025 g (5.8×10$^{-5}$ moles) of (ANiT-FA)$_2$ was weighed out in a vial and dissolved in 3.5 ml of o-dichlorobenzene. The orange solution was clarified by passing through a 0.5 micron Millipore filter into a Schlenk bomb. 0.400 g (4.25×10$^{-3}$ mole) of 5-methyl-1,3-cyclohexadiene was passed through 0.5 cm of basic alumina in the dry box and was injected into the catalyst solution. The bomb was sealed up, freeze-pump-thawed three times, and filled with argon. The polymerization mixture was heated for 24 hours in a 50° C. oil bath before precipitating out the polymer by pouring the mixture into 40 ml of methanol. The resulting grey gum was redissolved in 20 ml of benzene and re-precipitated into methanol after passing the solution through a 0.5 micron Millipore filter. 0.132 g (33.0%) of a white, soluble powder was isolated by suction filtration and dried under dynamic vacuum:

$^1$H NMR (CDCl$_3$): 0.8–1.0 ppm (3H); 1.2–2.2 ppm (5H); 5.4–5.8 ppm (2H).

GPC: Mn=1406 ) vs. polystyrene standards Mw=1628 ) PDI=1.16

XRD: no sharp lines=>amorphous

DSC: stable up to ≈330° C., contrast to PCHD 320° C.

Neopentyl, and other substituted CHDs, are synthesized and polymerized similarly. Because these alkyl-substituted PCHDs are soluble and have the same thermal stability as the parent PCHD polymer, they are likely to find use as inexpensive, high performance polymers, especially when a small amount is copolymerized with normal CHD to make the PCHD soluble.

Preparation of Poly(cis-5,6-dihydroxy-1,3-cyclohexadiene)

A 250 ml Schlenk flask was charged with a 1.0M solution of tetrabutylammonium fluoride in THF (40 ml) and additional dry THF (20 ml) via syringe under Ar flush. A solution of poly(cis-5,6-trimethylsiloxy-1,3-cyclohexadiene (1.52 g) in dry THF (20 ml) was added dropwise over a period of 20 min to the rapidly stirred solution of (Bu)$_4$NF. A thick yellow gum precipitated from the reaction mixture. Rapid stirring was continued for 4 hr, then the product was precipitated by the addition of anhydrous methanol (20 ml). After 12 hr, a colorless solid was isolated by filtration and washed with methanol (40 ml). The colorless precipitate was dried under vacuum (10$^{-4}$ mm Hg) for 12 hr.

Preparation of Poly(cis-5,6-diacetoxy-1,3-cyclohexadiene)

Under Ar, a 100 ml Schlenk tube with a polytetrafluoroethylene valve was charged with poly(cis-5,6-dihydroxy-1,3-cyclohexadiene) (553 mg). Dry pyridine (6.0 ml) and distilled, degassed acetic anhydride (2.6 ml) were added sequentially as neat liquids via syringe to the reaction flask under Ar flush. The flask was tightly sealed and the mixture was heated at 80° C. with stirring for 24 hr. The initial slurry of the reactant dissolved, affording a clear, pale yellow solution. The mixture was cooled to ambient temperature and the volatiles were removed in vacuo. The remaining yellow, glassy liquid was dissolved in dichloromethane (50 ml) and extracted sequentially wit saturated aqueous $NaHCO_3$ (25 ml) and saturated NaCl (25 ml) solutions. The organic phase was separated, dried over anhydrous $Na_2SO_4$, and filtered. The clear, pale yellow filtrate was concentrated to 5 ml by rotary evaporation. The concentrate was added dropwise to stirred hexanes (150 ml) to precipitate the polymer. The pale yellow precipitate was isolated by filtration and washed with hexanes (2x 30 ml). The colorless solid was dried under high vacuum ($10^{-4}$ mm Hg) for 12 hr. Yield: 93% based on starting 1,4-poly-(TMS-CHD), over two steps.

Thus, there has been disclosed a process for the preparation of fully acetylated 1,4-poly(cis-5,6-diacetoxy-1,3-cyclohexadiene) and for converting the fully acetylated polymer to poly(para-phenylene) having essentially 100% 1,4-linkages and essentially no 1,2-linkages. It will be apparent to those skilled in the art that various modifications and changes of an obvious nature may be made, and all such modifications and changes are considered to fall within the scope of the invention, as defined by the appended claims.

What is claimed is:

1. A process by which 1,4-poly(cis-5,6-bis(trimethylsiloxy)-1,3-cyclohexadiene) is converted to 1,4-poly(cis-5,6-dihydroxy-1,3-cyclohexadiene) using a source of fluoride and an alcohol having 1 to 4 carbon atoms.

2. The process of claim 1 wherein said source of fluoride consists essentially of a compound selected from the group consisting of potassium, fluoride in a crown ether, and an ammonium fluoride salt, and wherein said alcohol is selected from the group consisting of methanol, ethanol, and iso-propanol.

3. The process of claim 2 wherein said ammonium fluoride salt is tetra-butylammonium fluoride.

4. The polymer made by the process of claim 1.

5. A process by which 1,4-poly(cis-5,6-bis(trimethylsiloxy)-1,3-cyclohexadiene) is converted to 1,4-poly(cis-5,6-dihydroxy-1,3-cyclohexadiene) using an anhydrous strong acid.

6. The process of claim 5 wherein said anhydrous strong acid comprises anhydrous HCl in methanol.

7. The polymer made by the process of claim 5.

* * * * *